United States Patent
Umeya

(10) Patent No.: US 11,825,783 B2
(45) Date of Patent: Nov. 28, 2023

(54) UNMANNED AERIAL VEHICLE

(71) Applicant: M Line System Co., Ltd., Kawaguchi (JP)

(72) Inventor: Kaoru Umeya, Kawaguchi (JP)

(73) Assignee: M Line System Co., Ltd., Saitama (JP)

( * ) Notice: Subject to any disclaimer, the term of this patent is extended or adjusted under 35 U.S.C. 154(b) by 0 days.

(21) Appl. No.: 17/754,346

(22) PCT Filed: Jan. 11, 2022

(86) PCT No.: PCT/JP2022/000544
§ 371 (c)(1),
(2) Date: Mar. 30, 2022

(87) PCT Pub. No.: WO2022/168536
PCT Pub. Date: Aug. 11, 2022

(65) Prior Publication Data
US 2022/0394931 A1    Dec. 15, 2022

(30) Foreign Application Priority Data
Feb. 5, 2021 (JP) .................. 2021-017340

(51) Int. Cl.
*A01G 3/08* (2006.01)
*A01G 3/02* (2006.01)
(Continued)

(52) U.S. Cl.
CPC ............... *A01G 3/08* (2013.01); *A01G 3/02* (2013.01); *A01G 3/085* (2013.01); *B64C 39/024* (2013.01);
(Continued)

(58) Field of Classification Search
CPC .............. A01G 23/095; A01G 23/0955; A01G 3/0255; A01G 3/04; A01G 3/0462; A01G 3/08; A01G 3/085; B27L 1/06
See application file for complete search history.

(56) References Cited

U.S. PATENT DOCUMENTS 10,314,241 B1 *  6/2019  Dunn ................... B64D 1/22
2016/0205872 A1 *  7/2016  Chan ...................... A01G 3/08
(Continued)

FOREIGN PATENT DOCUMENTS

CN     107318492 A  * 11/2017  ............. A01G 3/085
CN     109566138 A  *  4/2019
(Continued)

OTHER PUBLICATIONS

English translate (CN107318492A), retrieved date Feb. 6, 2023.*
(Continued)

*Primary Examiner* — Matthew Katcoff
*Assistant Examiner* — Mohammed S. Alawadi
(74) *Attorney, Agent, or Firm* — Simpson & Simpson, PLLC; S. Peter Konzel

(57) ABSTRACT

[Problems to be Solved]
To provide an unmanned aerial vehicle capable of achieving both of equipping a pruning structure capable of pruning trees and enhancing safety.
[Solution]
An unmanned aerial vehicle 2 according to the present invention includes a pruning structure 23 capable of pruning a tree; a housing structure 24 capable of housing the pruning structure 23 inside; and a state control section 212 capable of controlling the state of the pruning structure 23 between a housed state in which the pruning structure 23 is housed inside the housing structure 24 and an exposed state in which the pruning structure 23 is exposed to the outside of the
(Continued)

housing structure 24, wherein the state control section 212 can control the state of the pruning structure 23 to the housed state on landing. The state control section 212 preferable to control the state of the pruning structure 23 to the exposed state when a distance from the unmanned aerial vehicle 2 to a target tree to be pruned equal to or shorter than the predetermined distance, and to control the state of the pruning structure 23 to the housed state when a distance from the unmanned aerial vehicle 2 to the target tree longer than the predetermined distance.

7 Claims, 9 Drawing Sheets

(51) Int. Cl.

| | | |
|---|---|---|
| *B64C 39/02* | (2023.01) | |
| *G05D 1/10* | (2006.01) | |
| *G06N 3/08* | (2023.01) | |
| *G06T 7/55* | (2017.01) | |
| *G06T 7/70* | (2017.01) | |
| *G06V 10/774* | (2022.01) | |
| *G06V 10/82* | (2022.01) | |
| *G06V 20/17* | (2022.01) | |
| *G06V 20/10* | (2022.01) | |
| *B64U 10/10* | (2023.01) | |
| *B64U 30/20* | (2023.01) | |
| *B64U 101/30* | (2023.01) | |
| *B64U 101/40* | (2023.01) | |

(52) U.S. Cl.
CPC .............. *G05D 1/101* (2013.01); *G06N 3/08* (2013.01); *G06T 7/55* (2017.01); *G06T 7/70* (2017.01); *G06V 10/774* (2022.01); *G06V 10/82* (2022.01); *G06V 20/17* (2022.01); *G06V 20/188* (2022.01); *B64U 10/10* (2023.01); *B64U 30/20* (2023.01); *B64U 2101/30* (2023.01); *B64U 2101/40* (2023.01); *G06T 2207/10032* (2013.01); *G06T 2207/20081* (2013.01); *G06T 2207/20084* (2013.01); *G06T 2207/30188* (2013.01)

(56) References Cited

U.S. PATENT DOCUMENTS

| | | | |
|---|---|---|---|
| 2019/0166765 A1* | 6/2019 | Maor | .................... G06F 16/29 |
| 2020/0367441 A1 | 11/2020 | Guzman-Lopez | |
| 2022/0174880 A1* | 6/2022 | Robinson | ............. A01G 23/095 |
| 2022/0174932 A1* | 6/2022 | Ravanat | .................. A01M 5/02 |

FOREIGN PATENT DOCUMENTS

| | | | | |
|---|---|---|---|---|
| CN | 210695076 U | | 6/2020 | |
| CN | 210987175 U | | 7/2020 | |
| CN | 211881182 | | 11/2020 | |
| EP | 3354127 A1 * | | 8/2018 | ........... A01G 3/0335 |
| KR | 10-2187942 | | 12/2017 | |
| WO | WO-2021258411 A * | | 12/2021 | ............... A01G 3/08 |

OTHER PUBLICATIONS

English translate (EP3354127A1), retrieved date Feb. 6, 2023.*
English translate (WO2021258411A1), retrieved date Feb. 6, 2023.*
English translate (CN109566138A), retrieved date Feb. 15, 2023.*

* cited by examiner

FIG.3

(TREE IMAGE TABLE 321)

| TREE IMAGE ID | TREE ID | TREE IMAGE | IMAGE INFORMATION |
|---|---|---|---|
| P1 | T1 | 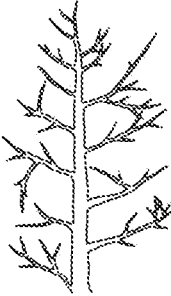 | TAKEN AT ALTITUDE OF 5m<br>PHOTOGRAPHING POSITION(X,Y)<br>PHOTOGRAPHER<br>DATE OF PHOTOGRAPHING:<br>YYYY/MM/DD<br>HH:mm:SS |
| P2 | T1 | 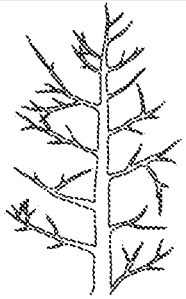 | TAKEN AT ALTITUDE OF 2m<br>PHOTOGRAPHING POSITION(x,y)<br>PHOTOGRAPHER<br>DATE OF PHOTOGRAPHING:<br>YYYY/MM/DD<br>HH:mm:SS |
| P3 | T2 | 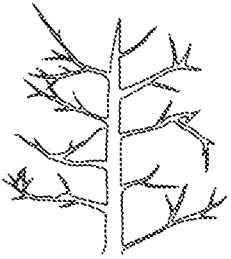 | TAKEN AT ALTITUDE OF 5m<br>PHOTOGRAPHING POSITION(X,Y)<br>PHOTOGRAPHER<br>DATE OF PHOTOGRAPHING:<br>YYYY/MM/DD<br>HH:mm:SS |
| : | : | : | : |

FIG.4

(NEURAL NETWORK TABLE 322)

| NEURAL NETWORK ID | WEIGHT MATRIX A | WEIGHT MATRIX B | ⋯ |
|---|---|---|---|
| N1 | $A1 = \begin{pmatrix} a111 & a112 & \ldots & a119 \\ a121 & a122 & \ldots & a129 \\ \vdots & \vdots & & \vdots \\ a171 & a172 & \ldots & a179 \end{pmatrix}$ | $B1 = \begin{pmatrix} b111 & b112 & \ldots & b114 \\ b121 & b122 & \ldots & b124 \\ \vdots & \vdots & & \vdots \\ b191 & b192 & \ldots & b194 \end{pmatrix}$ | ⋯ |
| N2 | $A2 = \begin{pmatrix} a211 & a212 & \ldots & a219 \\ a221 & a222 & \ldots & a229 \\ \vdots & \vdots & & \vdots \\ a241 & a242 & \ldots & a249 \end{pmatrix}$ | $B2 = \begin{pmatrix} b211 & b212 & \ldots & b217 \\ b221 & b222 & \ldots & b227 \\ \vdots & \vdots & & \vdots \\ b291 & b292 & \ldots & b297 \end{pmatrix}$ | ⋯ |
| N3 | $A3 = \begin{pmatrix} a311 & a312 & \ldots & a319 \\ a321 & a322 & \ldots & a329 \\ \vdots & \vdots & & \vdots \\ a341 & a342 & \ldots & a349 \end{pmatrix}$ | $B3 = \begin{pmatrix} b311 & b312 & \ldots & b317 \\ b321 & b322 & \ldots & b327 \\ \vdots & \vdots & & \vdots \\ b391 & b392 & \ldots & b397 \end{pmatrix}$ | ⋯ |
| ⋮ | ⋮ | ⋮ | ⋱ |

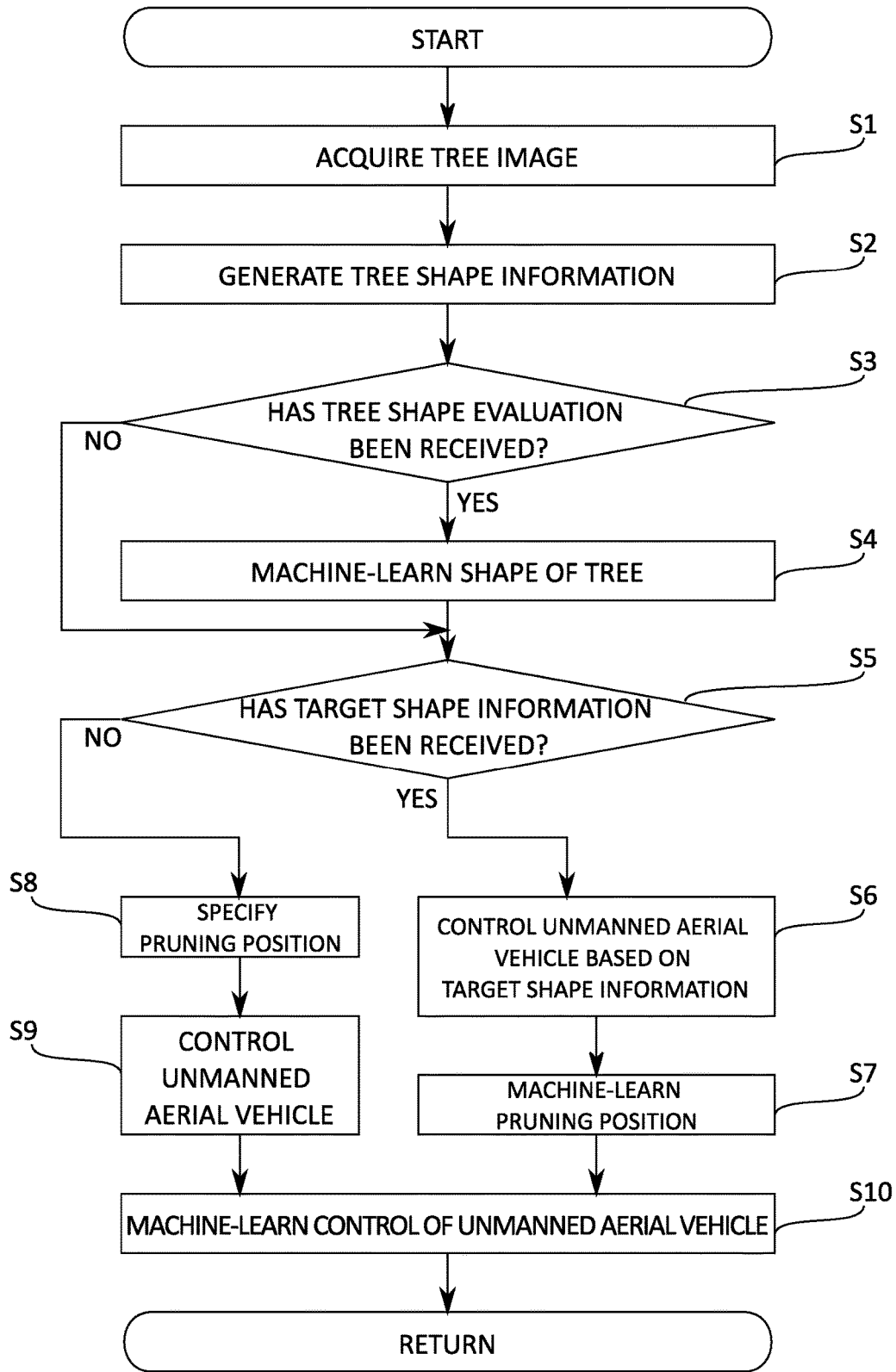

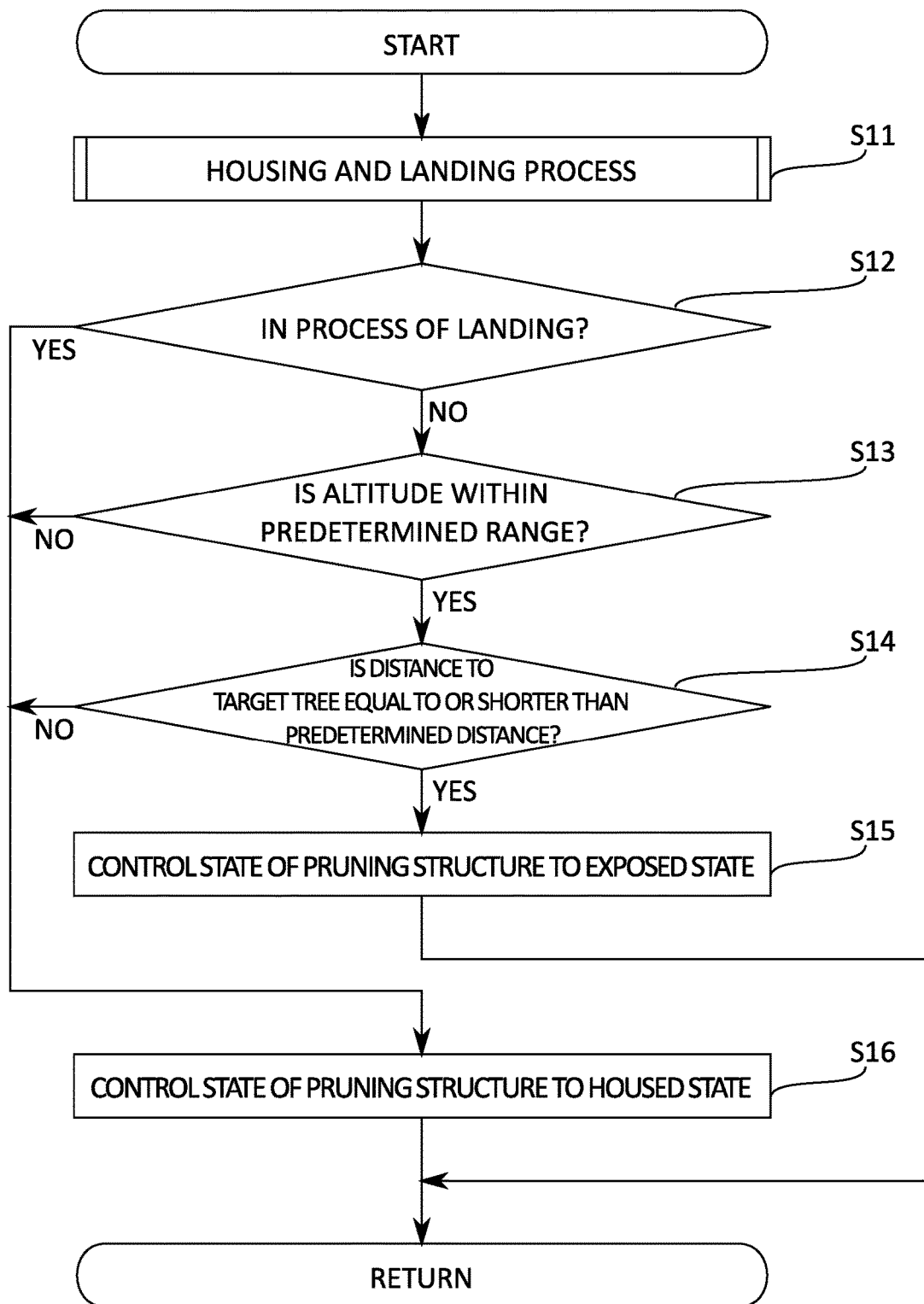

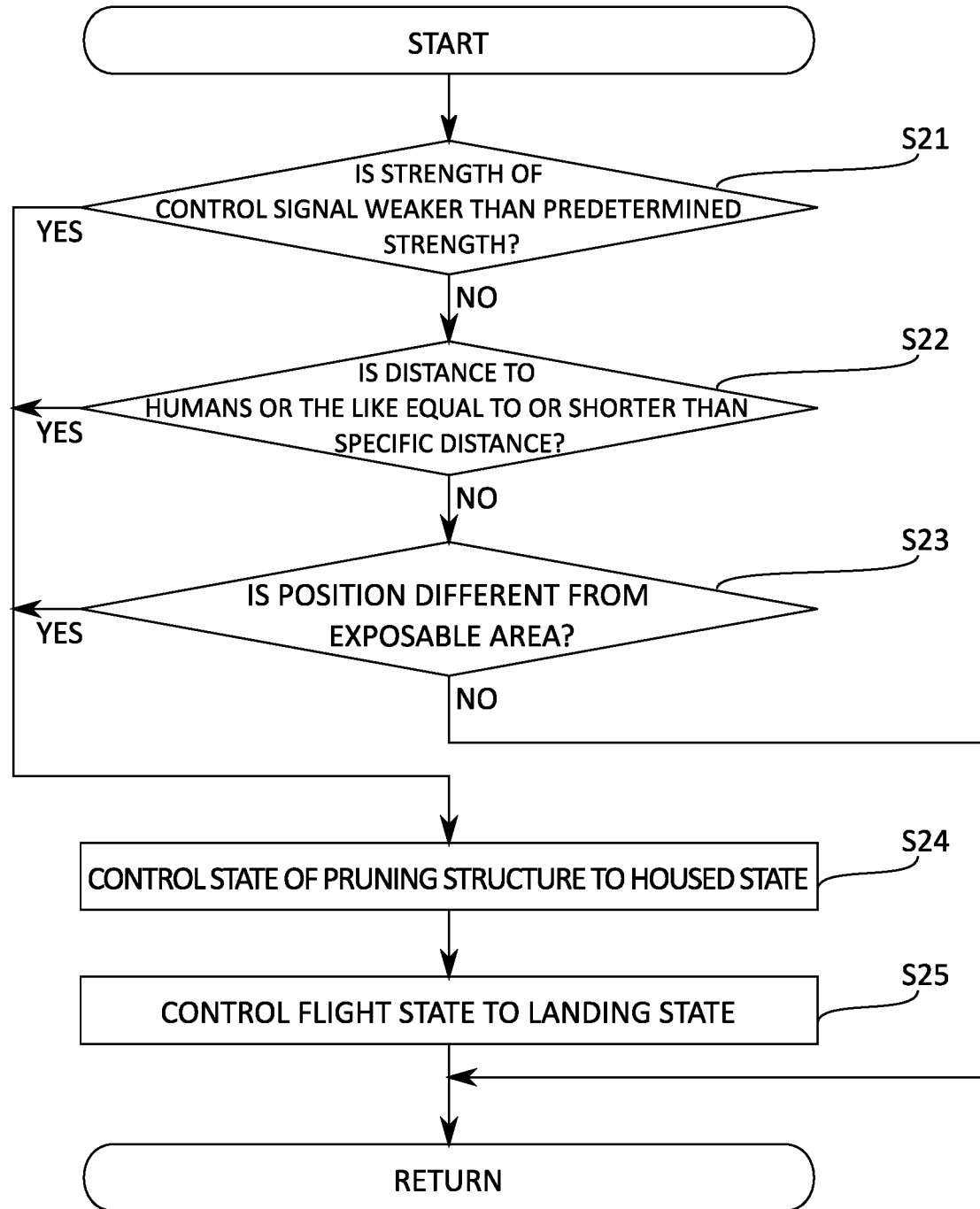

UNMANNED AERIAL VEHICLE

TECHNICAL FIELD

The present invention relates to an unmanned aerial vehicle.

BACKGROUND ART

Pruning is conducted to adjust a shape of a tree by cutting branches of the tree. Pruning can make the tree good-looking. Pruning may improve airflow in the tree. Pruning may allow the tree to efficiently utilize nutrients. This may promote growth of the tree. In addition, pruning may prevent propagation of diseases and pests in trees.

Large trees exemplified by Japanese cherry, Japanese zelkova, gingko, Japanese elm, weeping willows, and rowan tree, or the like may be five meters or more in height. As such, pruning of a large tree among trees may make it necessary to work at a high place. When working at height, it is necessary to take safety measures to protect safety of workers. Such safety measures may be a burden on a pruning operator or the like. If a large tree could be pruned by using an unmanned aerial vehicle (which is also referred to as an unmanned aerial vehicle, UAV, or a drone), exemplified by a multicopter or the like, which is capable of remote operation and/or autonomous control, the burden on the operator or the like involved in the safety measures could be mitigated.

As an example of a device to cut a part of a tree using an unmanned aerial vehicle, PLT 1 discloses an unmanned aerial vehicle including a fruit cutting unit for assisting in removal of fruits from branches. PLT1 also discloses pruning shears, saws, scissors, and planting shears as examples of the fruit cutting units. According to PLT1, use of the unmanned aerial vehicle including scissors or the like may make it possible to remove fruits from branches of fruit-bearing trees.

CITATION LIST

Patent Literature

[PTL 1] Japanese Unexamined Patent Application Publication (Translation of PCT application) No. 2019-532666

SUMMARY OF THE INVENTION

Problems to be Solved by the Invention

Incidentally, when an unmanned aerial vehicle includes a pruning mechanism exemplified by scissors and saws, safety measures are required. Since PLT1 has no specific description of safety measures, it has room for further improvement in terms of enhancing the safety measures.

The present invention has been made in light of such circumstances and aims to provide an unmanned aerial vehicle capable of achieving both of equipping a pruning structure capable of pruning trees and enhancing safety.

Means for Solving the Problems

As a result of diligent study of the above problems, the inventor et. al have found that it is possible to achieve the above object by comprising a housing structure capable of housing a pruning structure and a state control section capable of controlling the state of the pruning structure between a housed state in which the pruning structure is housed inside the housing structure and an exposed state in which the pruning structure is exposed to the outside of the housing structure, and has completed the present invention. Specifically, the present invention provides the following.

The invention according to a first characteristic provides an unmanned aerial vehicle comprising: a pruning structure capable of pruning a tree; a housing structure capable of housing the pruning structure inside; and a state control section capable of controlling the state of the pruning structure between a housed state in which the pruning structure is housed inside the housing structure and an exposed state in which the pruning structure is exposed to the outside of the housing structure, wherein the state control section controls the state of the pruning structure to the housed state during landing.

With the invention according to the first characteristic, the unmanned aerial vehicle may prune trees by using the pruning structure in the exposed state in which the pruning structure is exposed to the outside of the housing structure. On the other hand, the state control section controls the state of the pruning structure to the housed state during landing. Consequently, it may be possible to prevent humans or the like from being injured by the pruning structure during landing.

Therefore, with the invention according to the first characteristic, it is possible to provide an unmanned aerial vehicle capable of achieving both of equipping a pruning structure capable of pruning trees and enhancing safety.

The invention according to a second characteristic is the invention according to the first characteristic, and provides an unmanned aerial vehicle, wherein the state control section controls the state of the pruning structure to the exposed state when a distance from the unmanned aerial vehicle to a target tree to be pruned equal to or shorter than the predetermined distance, and controls the state of the pruning structure to the housed state when a distance from the unmanned aerial vehicle to the target tree longer than the predetermined distance.

In tree pruning using the unmanned aerial vehicle having the pruning structure, the unmanned aerial vehicle flies periphery of the target tree to be pruned. On the other hand, when the unmanned aerial vehicle flies distant from the target tree, the unmanned aerial vehicle does not prune the tree.

With the invention according to the second characteristic, the state control section can control the state of the pruning structure to the exposed state when a distance from the unmanned aerial vehicle to a target tree to be pruned equal to or shorter than the predetermined distance. This may allow the pruning structure to prune a tree in the exposed state.

With the invention according to the second characteristic, the state control section controls the state of the pruning structure to the housed state when a distance from the unmanned aerial vehicle to the target tree longer than the predetermined distance. This may further enhance the safety of the unmanned aerial vehicle when trees are not pruned.

Therefore, with the invention according to the second characteristic, it is possible to provide an unmanned aerial vehicle capable of achieving both of equipping a pruning structure capable of pruning trees and enhancing safety.

The invention according to a third characteristic is the invention according to the first or second characteristic, and provides an unmanned aerial vehicle further comprising a flight state control section capable of controlling a flight state of the unmanned aerial vehicle, wherein the state control section controls the state of the pruning structure to the housed state when a strength of an externally received control signal related to the control of the unmanned aerial vehicle is weaker than a predetermined strength and the flight state control section controls the flight state of the unmanned aerial vehicle to a landing state when the pruning structure is housed inside the housing structure.

By controlling the unmanned aerial vehicle with a control signal from the outside, the safety of the unmanned aerial vehicle may be enhanced, as compared to a case of performing autonomous flight without using the control signal from the outside. However, there may be some cases where the unmanned aerial vehicle cannot receive a control signal from the outside with a strength equal to or higher than the predetermined strength due to deterioration of a communication state or the like. If the control signal from the outside cannot be received with the strength equal to or higher than the predetermined strength, there is a possibility that the unmanned aerial vehicle cannot be controlled with the control signal from the outside. Therefore, the unmanned aerial vehicle including the pruning structure has room for further improvement in enhancing the safety when the control signal from the outside cannot be received with the strength equal to or higher than the predetermined strength.

With the invention according to the third characteristic, by controlling the state of the pruning structure to the housed state when a strength of an externally received control signal related to the control of the unmanned aerial vehicle is weaker than a predetermined strength, it may be possible to enhance the safety when the control signal from the outside cannot be received with the strength equal to or higher than the predetermined strength. In addition, by the flight state control section controlling the flight state of the unmanned aerial vehicle to a landing state when the pruning structure is housed inside the housing structure, it may make the flying time shorter than it without controlling to a landing state, when external control signals can not control the unmanned aircraft. Therefore, with the invention according to the third characteristic, this may further enhance the safety when the control signal from the outside cannot be received with the strength equal to or higher than the predetermined strength.

Therefore, with the invention according to the third characteristic, it is possible to provide an unmanned aerial vehicle capable of achieving both of equipping a pruning structure capable of pruning trees and enhancing safety.

The invention according to a fourth characteristic is the invention according to any of the first characteristic to third characteristic, and provides an unmanned aerial vehicle further comprising a flight state control section capable of controlling a flight state of the unmanned aerial vehicle, wherein the state control section controls the state of the pruning structure to the housed state when a distance from the unmanned aerial vehicle to the humans and/or the animals in the periphery of the unmanned aerial vehicle is equal to or shorter than the specific distance and the flight state control section controls the flight state of the unmanned aerial vehicle to a landing state when the pruning structure is housed inside the housing structure.

If there is a human in the periphery of the flying unmanned aerial vehicle, the human may jump out into a path of the unmanned aerial vehicle and collide with the flying unmanned aerial vehicle and/or the pruning structure. If there is an animal exemplified by a pet and a farm animal or the like, in the periphery of the flying unmanned aerial vehicle, the animal may jump out into the path of the flying unmanned aerial vehicle and collide with the unmanned aerial vehicle and/or the pruning structure. The possibility of the flying unmanned aerial vehicle injuring a human and/or an animal by rotating propellers and/or rotors is higher than the unmanned aerial vehicle not in flight. Therefore, he unmanned aerial vehicle including the pruning structure has room for further improvement in terms of enhancing the safety when there are humans and/or animals in the periphery of the unmanned aerial vehicle.

With the invention according to the fourth characteristic, by the state control section controlling the state of the pruning structure to the housed state when a distance from the unmanned aerial vehicle to the humans and/or the animals in the periphery of the unmanned aerial vehicle is equal to or shorter than the specific distance, it may be possible to enhance the safety when there are humans and/or animals in the periphery of the unmanned aerial vehicle. In addition, by the flight state control section controlling the flight state of the unmanned aerial vehicle to a landing state when the pruning structure is housed inside the housing structure, it may reduce a possibility that the unmanned aerial vehicle may collide with humans and/or animals. Therefore, with the invention according to the fourth characteristic, this may further enhance the safety when there are humans and/or animals in the periphery of the unmanned aerial vehicle.

Therefore, with the invention according to the fourth characteristic, it is possible to provide an unmanned aerial vehicle capable of achieving both of equipping a pruning structure capable of pruning trees and enhancing safety.

The invention according to a fifth characteristic is the invention according to any of the first characteristic to fourth characteristic, and provides an unmanned aerial vehicle further comprising an altitude acquisition section capable of acquiring an altitude of the unmanned aerial vehicle, wherein the state control section controls the state of the pruning structure to the housed state when the altitude is not within the predetermined range.

If the unmanned aerial vehicle is close to the ground, more specifically, when the altitude of the unmanned aerial vehicle is low, there is a possibility that the unmanned aerial vehicle may collide with humans and/or animals. In addition, when the altitude of the unmanned aerial vehicle is low, there is a possibility that the unmanned aerial vehicle may collide with a property on the ground exemplified by houses, agricultural products, and automobiles, or the like. The unmanned aerial vehicle including the pruning structure has room for further improvement in terms of enhancing the safety when the altitude of the unmanned aerial vehicle is low.

In the unlikely event that the unmanned aerial vehicle flying over a high altitude loses control and crashes, a speed at which the unmanned aerial vehicle falls is faster than a case where the altitude of the unmanned aerial vehicle is low. Consequently, the adverse effect given by the unmanned aerial vehicle on humans or the like when the unmanned aerial vehicle flying over a high altitude loses control of the flight state and crashes and the pruning structure collides with the humans or the like may be larger than the case where the altitude of the unmanned aerial vehicle is low. Therefore, the unmanned aerial vehicle including the pruning structure has room for further improvement in terms of enhancing the safety when the altitude of the unmanned aerial vehicle is high.

If the altitude of the unmanned aerial vehicle is higher than height of the target tree by a certain amount or more, a distance from the unmanned aerial vehicle to the target tree is farther than a distance at which the pruning structure can prune the tree. If the distance from the unmanned aerial vehicle to the target tree is farther than the distance at which the tree can be pruned, the pruning structure does not prune the tree. Therefore, the unmanned aerial vehicle including the pruning structure also has room for further improvement in terms of enhancing the safety when the altitude of the unmanned aerial vehicle is higher than the height of the tree by the certain amount or more.

With the invention according to the fifth characteristic, by the state control section controlling the state of the pruning structure to the housed state when the altitude is not in the predetermined range, it may be possible to enhance the safety when the altitude of the unmanned aerial vehicle is low and the safety when the altitude of the unmanned aerial vehicle is high.

Therefore, with the invention according to the fifth characteristic, it is possible to provide an unmanned aerial vehicle capable of achieving both of equipping a pruning structure capable of pruning trees and enhancing safety.

The invention according to a sixth characteristic is the invention according to any of the first characteristic to fifth characteristic, and provides an unmanned aerial vehicle further comprising a position acquisition section capable of acquiring a position of the unmanned aerial vehicle, wherein the flight state control section controls the state of the pruning structure to the housed state when the position is different from an exposable area where the pruning structure can be exposed and the flight state control section can control the flight state of the unmanned aerial vehicle to a landing state when the pruning structure is housed inside the housing structure.

If the unmanned aerial vehicle is located at a position different from a predetermined area where the target tree is located, the pruning structure does not prune the target tree. Therefore, the unmanned aerial vehicle including the pruning structure has room for further improvement in terms of enhancing the safety when the unmanned aerial vehicle is located at the position different from the predetermined area.

In the case of the unmanned aerial vehicle that receives a control signal related to the control of the unmanned aerial vehicle from the outside, in general, the strength of the control signal becomes weaker, as the distance to the unmanned aerial vehicle from the outside from which the control signal is transmitted increases. In addition, if there is a shield exemplified by terrain, a building, or the like between the outside from which the control signal is transmitted and the unmanned aerial vehicle, the strength of the control signal may degrade. Therefore, an area where the unmanned aerial vehicle can receive the control signal from the outside with the strength equal to or higher than the predetermined strength may be limited to a specific area that is defined by a distance from the outside from which the control signal is transmitted and/or the shield, or the like.

If the control signal from the outside cannot be received with the strength equal to or higher than the predetermined strength, there is a possibility that the unmanned aerial vehicle cannot be controlled with the control signal from the outside. Therefore, there is a possibility that unmanned aerial vehicle cannot receive the control signal from the outside with the strength equal to or higher than the predetermined strength, when the unmanned aerial vehicle is located at a position different from the specific area where the control signal can be received with the strength equal to or higher than the predetermined strength. Therefore, the unmanned aerial vehicle including the pruning structure and receiving the control signal from the outside has room for further improvement in terms of enhancing the safety of the unmanned aerial vehicle when the unmanned aerial vehicle is located at a position different from the specific area.

In order to enhance the safety related to flight of the unmanned aerial vehicle, the area where the flight of the unmanned aerial vehicle is prohibited is defined by various laws and regulations related to the flight of the unmanned aerial vehicle (for example, Act on Prohibition of Flight of Small Unmanned Aerial Vehicles, etc. Over Areas Around Important Facilities (Act No. 9 of Heisei 28 (2016), the notification that defines the no-fly zone for unmanned aerial vehicles (Notice No. 461 of the Ministry of Land, Infrastructure, Transport and Tourism in Reiwa 1 (2019)). In the no-fly zone where flight is prohibited by the laws and regulations, or the like, it is defined that flight is allowed only when a permit is granted. In the no-fly zone where flight is prohibited by the laws and regulations, or the like, it is defined that flight is allowed only when a permit is granted. An area where the unmanned aerial vehicle including the pruning structure is allowed to fly with the pruning structure exposed may be restricted by the laws and regulations, or the like.

Flying in compliance with the laws and regulations or the like may enhance the safety of the unmanned aerial vehicle. The unmanned aerial vehicle including the pruning structure has room for further improvement in terms of enhancing the safety when such unmanned aerial vehicle is located at the position different from the area where the unmanned aerial vehicle is allowed to fly.

With the invention according to the sixth characteristic, for example, it may be possible to define the exposable area where the pruning structure can be exposed, on the basis of a predetermined area where the target tree is located, the specific area where the control signal from the outside can be received with the strength equal to or higher than the predetermined strength, and/or the area where flight is allowed based on the laws and regulations or the like. Then, it may be possible to prevent the unmanned aerial vehicle including the pruning structure expose the pruning structure when the unmanned aerial vehicle is located at the position different from the exposable area. This may further enhance the safety of the unmanned aerial vehicle.

With the invention according to the sixth characteristic, by the flight state control section controlling the flight state of the unmanned aerial vehicle to a landing state when the pruning structure is housed inside the housing structure, it may minimize the flying time when the unmanned aerial vehicle is located at the position different from the exposable area. This may further enhance the safety of the unmanned aerial vehicle.

Therefore, with the invention according to the sixth characteristic, it is possible to provide an unmanned aerial vehicle capable of achieving both of equipping a pruning structure capable of pruning trees and enhancing safety.

The invention according to a seventh characteristic is the invention according to any of the first characteristic to sixth characteristic, and provides an unmanned aerial vehicle that is a multicopter.

A multicopter that is a rotary-wing aircraft with three or more rotors (rotary wings) can ascend and/or descend by increasing or a decreasing a revolving speed of the rotors. In addition, the multicopter can tilt its body by differentiating the revolving speed of each of the rotors. This allows the multicopter to move forward, move backward, and/or turn, or the like. Since the multicopter can control its attitude by controlling the number of revolutions of each of the rotors, the multicopter may achieve the higher attitude stability than the single rotor helicopter with only one rotor.

With the invention according to the seventh characteristic, since the unmanned aerial vehicle is a multicopter, the attitude stability when the unmanned aerial vehicle prunes tree branches may be improved, as compared to a case of using the single rotor helicopter. This may prevent that the unmanned aerial vehicle collides with humans and other animals and/or property by the attitude of the unmanned aerial vehicle changing during the unmanned aerial vehicle pruning with the pruning structure. Therefore, with the invention according to the seventh characteristic, the safety of the unmanned aerial vehicle including the pruning structure may be enhanced.

It is known that the heavier the weight of aircraft is, the more difficult it becomes for the aircraft to land. The pruning structure may increase weight of the unmanned aerial vehicle. Therefore, the unmanned aerial vehicle including the pruning structure may find it more difficult to land than an unmanned aerial vehicle without including the pruning structure. If landing is difficult, a possibility that an accident or the like occurs when landing may increase. A multicopter can ascend and/or descend without changing its planar position with respect to the ground, as compared to the fixed-wing aircraft that obtains the lift force by using the fixed-wings and/or variable wings. As such, the multicopter may land more easily than the fixed-wing aircraft.

With the invention according to the seventh characteristic, even if the unmanned aerial vehicle is an unmanned aerial vehicle including the pruning structure, by the unmanned aerial aircraft being a multicopter, the unmanned aerial vehicle may be controlled to a landing state more easily, as compared to the case of using the fixed-wing aircraft. This may further reduce the possibility that an accident or the like occurs when landing. Therefore, with the invention according to the seventh characteristic, the safety of the unmanned aerial vehicle including the pruning structure may be enhanced.

Therefore, with the invention according to the seventh characteristic, it is possible to provide an unmanned aerial vehicle capable of achieving both of equipping a pruning structure capable of pruning trees and enhancing safety.

Effect of the Invention

Therefore, with the invention according to the present invention, it is possible to provide an unmanned aerial vehicle capable of achieving both of equipping a pruning structure capable of pruning trees and enhancing safety.

BRIEF DESCRIPTION OF DRAWINGS

FIG. 3 is a diagram illustrating an example of a tree image table 321.

FIG. 4 is a diagram illustrating an example of a neural network table 322.

FIG. 5 is a flowchart illustrating an example of a preferred flow of an operation control process using a control apparatus 3 of the present embodiment.

FIG. 6 is a flowchart illustrating an example of a preferred flow of a state control process using a control unit 21 of the present embodiment.

FIG. 7 is a flowchart illustrating an example of a preferred flow of a housing and landing process using the control unit 21 of the present embodiment.

MODES FOR CARRYING OUT THE INVENTION

Hereinafter, a description will be given of an example of a preferred mode for carrying out the present invention with reference to the drawings. It is to be noted that this is merely an example and that a technical scope of the present invention shall not be limited thereto.

<<Unmanned Aerial Vehicle System 1>>

Figure 1:
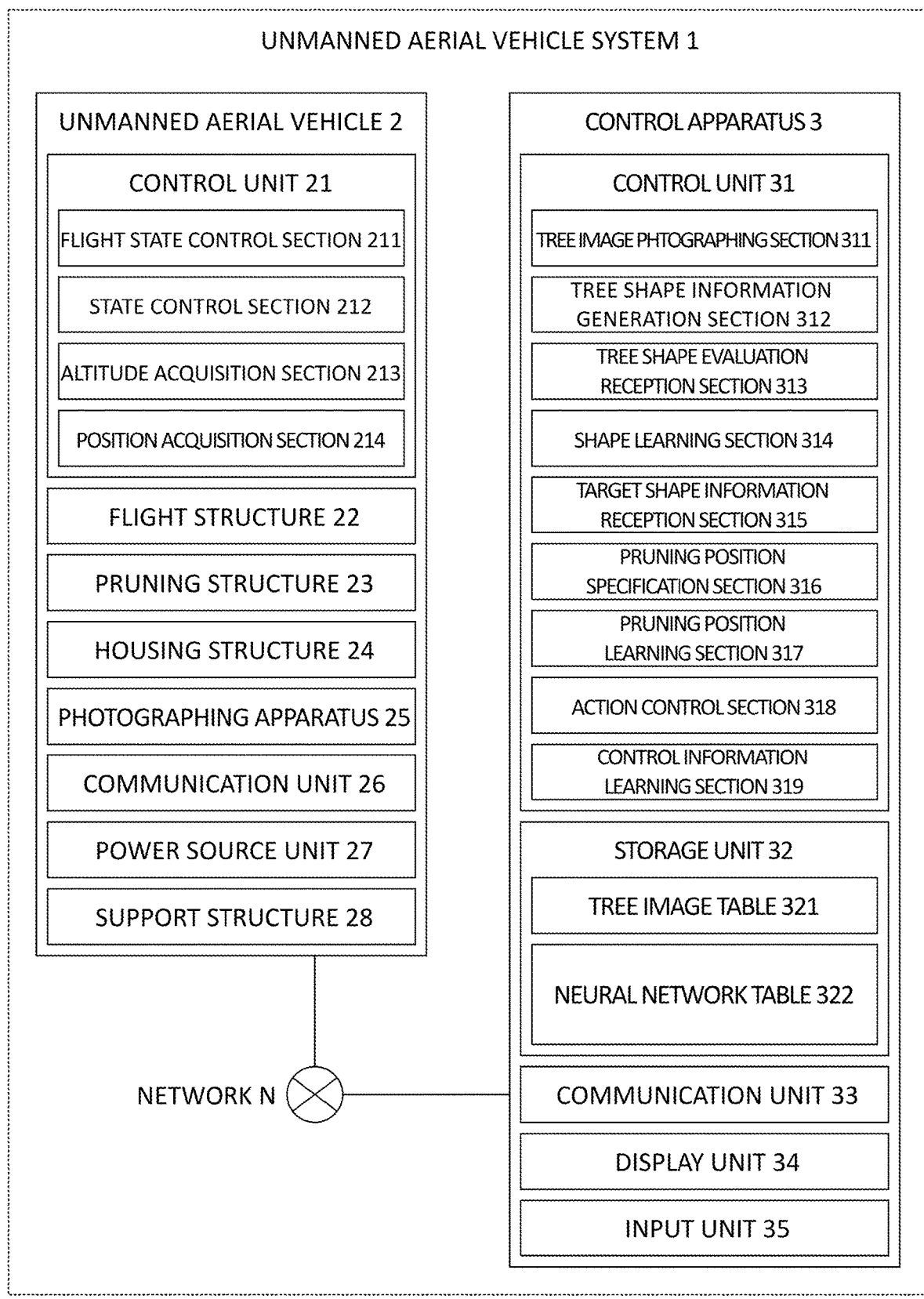
FIG. 1 is a block diagram illustrating a hardware configuration and a software configuration of an unmanned aerial vehicle system 1 of the present embodiment.
Figure 2:
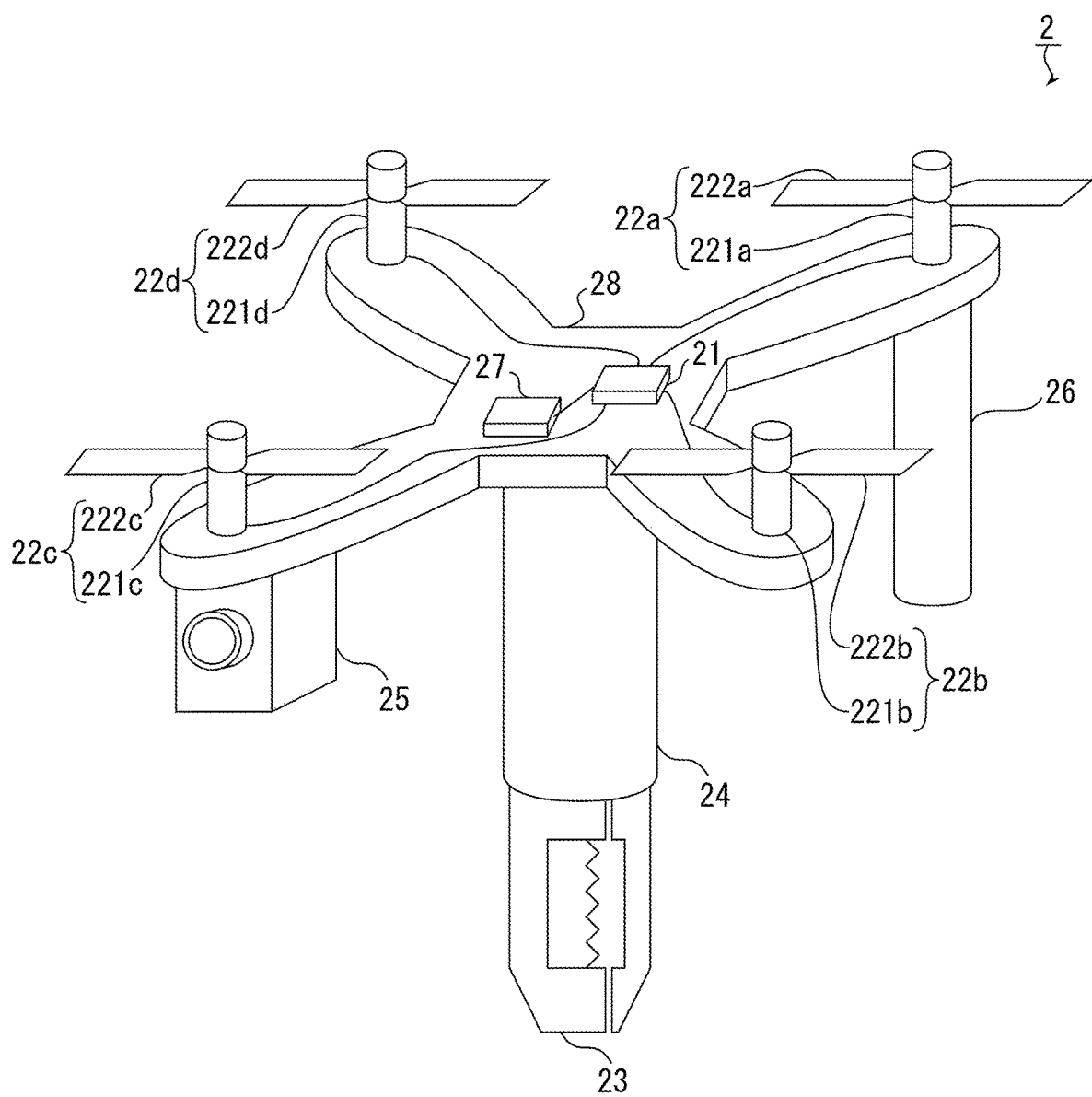
FIG. 2 is a schematic view when an unmanned aerial vehicle 2 of the present embodiment is viewed from diagonally above.

FIG. 1 is a block diagram illustrating a hardware configuration and a software configuration of an unmanned aerial vehicle system 1 of the present embodiment. FIG. 2 is a schematic view when an unmanned aerial vehicle 2 of the present embodiment is viewed from diagonally above. Hereinafter, a description will be given of a preferred configuration of the unmanned aerial vehicle system 1 in the embodiments of the present invention with reference to FIG. 1 and FIG. 2.

The unmanned aerial vehicle system 1 includes the unmanned aerial vehicle 2 and a control apparatus 3. The unmanned aerial vehicle 2 and the control apparatus 3 are each configured to be connected to each other via a network N.

<Unmanned Aerial Vehicle 2>

The unmanned aerial vehicle 2 includes at least a control unit 21, a flight structure 22, and a pruning structure 23.

It is preferable that the unmanned aerial vehicle 2 include a housing structure 24 capable of housing the pruning structure 23 inside, although this is not an essential aspect. By the unmanned aerial vehicle 2 including the housing structure 24, the pruning structure 23 can be housed inside the housing structure 24.

It is preferable that the unmanned aerial vehicle 2 include a photographing apparatus 25, although this is not an essential aspect. By the unmanned aerial vehicle 2 including the photographing apparatus 25, a target tree may be photographed.

It is preferable that the unmanned aerial vehicle 2 include a communication unit 26 that communicatively connects the unmanned aerial vehicle 2 and the control apparatus 3 via the network N, although this is not an essential aspect. By the unmanned aerial vehicle 2 including the communication unit 26, the unmanned aerial vehicle 2 may communicate with the control apparatus 3.

It is preferable that the unmanned aerial vehicle 2 include a power source unit 27. By the unmanned aerial vehicle 2 including the power source unit 27, electric power may be supplied to respective members that make up of the unmanned aerial vehicle 2.

It is preferable that the unmanned aerial vehicle 2 include a support structure 28 capable of supporting, in a predetermined positional relationship, two or more of the respective members included in the unmanned aerial vehicle 2, although this is not an essential aspect. By including the support structure 28, the respective members or the like can be supported so that the respective members or the like included in the unmanned aerial vehicle 2 maintain the predetermined positional relationship.

The unmanned aerial vehicle 2 is not particularly limited as long as the unmanned aerial vehicle 2 can fly. The unmanned aerial vehicle 2 may be, for example, a helicopter, a balloon, an airship, and/or a fixed-wing aircraft, or the like. The unmanned aerial vehicle 2, which is a helicopter, is not particularly limited, and may be a single rotor helicopter in which the number of rotors (which is also referred to as rotary wings) generating main lift force is one, a twin rotor helicopter having two rotary wings, and/or a multicopter having three or more rotary wings. The unmanned aerial vehicle 2, which is a fixed-wing aircraft, may be a fixed-wing aircraft that obtains the lift force by using the fixed wings and/or the rotary wings.

The unmanned aerial vehicle 2 is preferably a multicopter. A multicopter can ascend and/or descend by increasing or a decreasing a revolving speed of the rotor. The multicopter can tilt its body by differentiating the revolving speed of each of the rotors. This allows the multicopter to move forward, move backward, and/or turn, or the like. Since the multicopter can control its attitude by controlling the number of revolutions of each of the rotors, the multicopter may achieve the higher attitude stability than the single rotor helicopter with only one rotor.

By the unmanned aerial vehicle 2 being a multicopter, the attitude stability when pruning tree branches may be improved, as compared to a case of using the single rotor helicopter. This may make it possible to prevent the attitude of the unmanned aerial vehicle 2 from changing while pruning by means of the pruning structure 23, and a position of the pruning structure 23 from moving to a position different from the pruning position. Therefore, by the unmanned aerial vehicle 2 being a multicopter, it may be possible to prevent the pruning structure from pruning at a position different from the pruning position. This may make it possible to further adjust the shape of the tree.

A multicopter can perform hovering, which is resting at an approximately same position in the air, more easily than the fixed-wing aircraft that obtains the lift force by using the fixed and/or variable wings. By the unmanned aerial vehicle 2 being a multicopter, hovering may be performed in accordance with the pruning position and the pruning structure 23 may be controlled to perform pruning in accordance with the pruning position. This may allow pruning to be more aligned with the pruning position, as compared to a case of using the fixed-wing aircraft. Therefore, by the unmanned aerial vehicle 2 being a multicopter, further adjusting the shape of the tree may be made possible.

It is known that the heavier the weight of aircraft is, the more difficult it becomes for the aircraft to land. The pruning structure 23 may increase weight of the unmanned aerial vehicle 2. Therefore, the unmanned aerial vehicle 2 including the pruning structure 23 may find it more difficult to land than an unmanned aerial vehicle 2 without including the pruning structure 23. If landing is difficult, a possibility that an accident or the like occurs when landing may increase. A multicopter can ascend and/or descend without changing its planar position with respect to the ground, as compared to the fixed-wing aircraft that obtains the lift force by using the fixed-wings and/or variable wings. As such, the multicopter may land more easily than the fixed-wing aircraft.

Even if the unmanned aerial vehicle 2 is an unmanned aerial vehicle including the pruning structure 23, by the unmanned aerial vehicle 2 being a multicopter, the unmanned aerial vehicle 2 may be controlled to a landing state more easily, as compared to the case of using the fixed-wing aircraft. This may further reduce the possibility that an accident or the like occurs when landing. Therefore, by the unmanned aerial vehicle 2 being a multicopter, the safety of the unmanned aerial vehicle 2 including the pruning structure 23 may be enhanced.

[Control Unit 21]

The control unit 21 controls the flight structure 22 and the pruning structure 23. By the unmanned aerial vehicle 2 including the control unit 21, the unmanned aerial vehicle 2 may control the flight structure 22 and control a flight state of the unmanned aerial vehicle 2. In addition, by the unmanned aerial vehicle 2 including the control unit 2, the unmanned aerial vehicle 2 may control the pruning structure 23 and prune the target tree.

The control unit 21 is not particularly limited. The control unit 21 may be, for example, a microcomputer of the prior art that includes a CPU (Central Processing Unit), a RAM (Random Access Memory), and a ROM (Read Only Memory) or the like.

If the unmanned aerial vehicle 2 includes the housing structure 24, it is preferable that in cooperation with the flight structure 22, the pruning structure 23, the communication unit 26, or the like, the control unit 21 be able to implement elements of the software configuration in the unmanned aerial vehicle 2, such as a flight state control section 211, a state control section 212, an altitude acquisition section 213, a position acquisition section 214, or the like, as appropriate. This may allow the unmanned aerial vehicle 2 to perform a state control process to house the pruning structure 23 in the housing structure 24. The state control process performed by the unmanned aerial vehicle 2 will be described below in detail with reference to FIG. 6 and FIG. 7.

If the unmanned aerial vehicle 2 includes the communication unit 26, it is preferable that the control unit 21 be able to control the flight structure 22, the pruning structure 23, the photographing apparatus 25 or the like in response to a command transmitted from the control apparatus 3. This may make it possible to control the flight state of the unmanned aerial vehicle 2 and an operation of the pruning structure 23 in response to the command transmitted from the control apparatus 3. In addition, the target tree targeted for pruning may be photographed and a photographed tree image may be transmitted to the control apparatus 3 in response to the command transmitted from the control apparatus 3.

The command to be transmitted from the control apparatus 3 is not particularly limited, and examples thereof include a command to prune the target tree at the pruning position using the pruning structure 23, a command to move the unmanned aerial vehicle 2, a command to photograph the target tree using the photographing apparatus 25, and/or a command to land the unmanned aerial vehicle 2, or the like.

[Flight Structure 22]

The flight structure 22 is a structure to provide the unmanned aerial vehicle 2 with the lift force and/or buoyancy force to allow the unmanned aerial vehicle 2 to fly. The flight structure 22 is not particularly limited. The flight structure 22 is configured to be able to control the flight state of the unmanned aerial vehicle 2 according to control by the control unit 21.

If the unmanned aerial vehicle 2 is a balloon and/or an airship, the flight structure 22 preferably includes a balloon portion capable of containing a gas lighter than air. Inclusion of the balloon portion may allow the unmanned aerial vehicle 2 to fly with the buoyancy force provided by the gas lighter than the air. If the unmanned aerial vehicle 2 is a fixed-wing aircraft, the flight structure 22 preferably includes a propulsion unit capable of moving the unmanned aerial vehicle 2 and fixed wings and/or variable wings capable of generating the lift force in response to the movement of the unmanned aerial vehicle 2. This may move the unmanned aerial vehicle 2 and generate the lift force in response to this movement. This lift force may allow the unmanned aerial vehicle 2 to fly.

If the unmanned aerial vehicle 2 is a helicopter or the like that obtains the lift force by using one or more rotary wings, the flight structure 22 preferably includes one or more drive sections 221 and one or more rotary wings 222 rotated by the drive sections 221 (FIG. 2). As a result, the lift force can be obtained by using the drive sections 221 and rotating the rotary wings 222. This lift force may allow the unmanned aerial vehicle 2 to fly.

If the unmanned aerial vehicle 2 is a multicopter that obtains the lift force by using three or more rotary wings, it is preferable that the number of the flight structure 22 be three or more and that each of the three or more flight structures 22 include the drive section 221 and the rotary wing 222 rotated by the drive section 221. As a result, the lift force can be obtained by rotating the rotary wings 222. This lift force may allow the unmanned aerial vehicle 2o to fly. By each of the three or more flight structures 22 having the rotary wing 222, the multicopter can ascend and/or descend by increasing or decreasing the rotation speed of the rotary wing 222. In addition, by differentiating the number of rotations of each of the rotary wings 222, the multicopter can tilt its body. This allows the multicopter to move forward, move backward, and/or turn, or the like. Therefore, the unmanned aerial vehicle 2 may move to a predetermined position by ascending, descending, moving forward, moving backward, and/or turning, or the like.

By each of the three or more flight structures 22 including the drive section 221 and the rotary wing 222, the drive section 221 may directly rotate the rotary wing 222 without using a power distribution apparatus that distributes power, or the like. This may make the flight structure 22 to have a simple configuration. In addition, by the drive section 221 rotating the rotary wing 222 without the power distribution apparatus or the like, it may be possible to control the flight state using the flight structure 22 by relatively simple control that does not control the power distribution apparatus or the like.

Hereinafter, a description will be given, on the assumption that the unmanned aerial vehicle 2 is a multicopter, the number of the flight structures 22 is three or more, and each of the three or more flight structures 22 includes the drive section 221 and the rotary wing 222 rotated by the drive section 221.

Preferably, electric power supplied by the power source unit 27 is available to the flight structure 22. This may cause the flight structure 22 to operate utilizing the electric power supplied by the power source unit 27.

FIG. 2 illustrates a first flight structure 22a, a second flight structure 22b, a third flight structure 22c, and a fourth flight structure 22d as the flight structure 22 included in the unmanned aerial vehicle 2. Each of these flight structures 22 is connected with the control unit 21 and the power source unit 27 to be described below.

(Drive Section 221)

The drive sections 221 (reference numerals 221a, 221b, 221c, and 221d in FIG. 2) can be controlled by the control unit 21, and are not particularly limited as long as the drive section 221 is a drive section 221 capable of rotating the rotary wing 222. The drive section 221 preferably includes a motor that rotates the rotary wing 222 by means of electricity. By the drive section 221 including the motor, the control unit 21 may control the drive section 221 by relatively easy control via electricity. Then, the number of rotations or the like of the rotary wing 222 may be controlled. This may allow the control unit 21 to easily control the flight state of the unmanned aerial vehicle 2. If the drive section 221 includes the motor, it is preferable that the electric power supplied by the power source unit 27 be available to the drive section 221. As a result, the rotary wing 222 may be rotated by utilizing the electric power supplied by the power source unit 27.

(Rotary Wing 222)

The rotary wings 222 (reference numerals 222a, 222b, 222c, and 222d of FIG. 2) are not particularly limited as long as the rotary wing 222 is a rotary wing that can be rotated by the drive section 221 and generate the lift force by the rotation. The rotary wing 222 may be, for example, a rotary wing of a variable pitch capable of varying inclination of the rotary wing with respect to a rotation direction. By the rotary wing 222 being a rotary wing of the variable pitch, inclination of the rotary wing can be changed according to the rotation speed and the lift force can be obtained efficiently. The rotary wing 222 may be a rotary wing of a fixed pitch in which the inclination of the rotary wing with respect to the rotation direction is constant. By the rotary wings 222 being the rotary wing of the fixed pitch, the rotary wing 222 may have a simpler structure than the rotary wing of the variable pitch. This may improve maintainability and/or cost effectiveness, or the like of the unmanned aerial vehicle 2.

[Pruning Structure 23]

The pruning structure 23 is not particularly limited as long as the pruning structure 23 is a pruning structure capable of pruning a tree. The pruning structure 23 may be, for example, a pruning structure including one or more structures capable of pruning trees, exemplified by scissors, sawtooth, cutters, laser cutters, water cutters, or the like. The pruning structure 23 prunes a tree to be pruned which is a target of pruning, according to the control by the control unit 21.

If the unmanned aerial vehicle 2 includes the housing structure 24, it is preferable that the housing structure 24 be able to house the pruning structure 23. This may allow the unmanned aerial vehicle 2 to house the pruning structure 23 in the housing structure 24, as appropriate, and prevent humans or the like from being injured by the pruning structure.

If the housing structure 24 can house the pruning structure 23, preferably, the pruning structure 23 can be controlled to an exposed state in which the pruning structure 23 is exposed to the outside of the housing structure 24, according to control by a controller 2 and the pruning structure 23 can be controlled to a housed state in which the pruning structure 23 is housed inside the housing structure 24, according to the control by the controller 2. This may allow the unmanned aerial vehicle 2 to prune trees by using the pruning structure 23 in the exposed state. On the other hand, the unmanned aerial vehicle 2 may control a state of the pruning structure 23 to the housed state, thereby preventing the humans or the like from being injured by the pruning structure.

[Housing Structure 24]

The housing structure 24 is not particularly limited as long as the housing structure 24 can house the pruning structure 23. The housing structure 24 may be, for example, a structure that covers the pruning structure 23 in the housed state and house the pruning structure 23 inside.

[Photographing Apparatus 25]

The photographing apparatus 25 is not particularly limited as long as the photographing apparatus 25 can generate a tree image obtained by photographing a target tree targeted for pruning. The photographing apparatus 25 generates the tree image in response to a command transmitted from the control apparatus 3 to be described below, and provides the generated tree image to the control apparatus 3. The photographing apparatus 25 may be, for example, a digital still camera capable of generating a tree image which is a static image, a digital camcorder capable of generating a tree image which is a moving image, or the like.

[Communication Unit 26]

The communication unit 26 is not particularly limited as long as the communication unit 26 is a communication unit that connects the unmanned aerial vehicle 2 to the network N to allow the unmanned aerial vehicle 2 to communicate with the control apparatus 3. Examples of the communication unit 26 may include a communication unit having one or more of: a wireless device which corresponds to a faint radio station for wireless operation; a wireless device which corresponds to a specified low power radio station for telemeter/tele-control; a wireless device which corresponds to a low power data communication system; a wireless device which corresponds to an unmanned mobile object image transmission system; a wireless device compatible with a mobile phone network; a Wi-Fi (Wireless Fidelity) allowed device conforming to IEEE 802.11; an optical wireless device compatible with optical wireless communications; and a wired communication apparatus compatible with wired communications.

[Power Source Unit 27]

The power source unit 27 is a power source unit capable of supplying electric power to one or more of respective members included in a flying object 1, such as the control unit 21, the flight structure 22, the pruning structure 23, the housing structure 24, the photographing apparatus 25, and the communication unit 26 or the like. The power source unit 27 is not particularly limited and may be a power source unit of the prior art. The power source unit 27 may be a power source unit including, for example, a primary battery (for example, a dry battery, a wet cell, or the like), a secondary battery, a solar battery, a fuel cell, a nuclear battery, an all-solid-state battery, a generator (for example, a generator using an internal combustion engine and/or an external combustion engine, a micro wave generator, or the like), and one or more thereof.

Above all, the power source unit 27 preferably includes a battery exemplified by the primary battery, the secondary battery, and the all-solid-state battery, or the like. A battery has a simpler structure than a generator or the like. Therefore, by the power source unit 27 including a battery, a configuration of the power source unit 27 may be made to have a simple structure. This may improve the maintainability and/or the cost effectiveness or the like of the unmanned aerial vehicle 2.

[Support Structure 28]

The support structure 28 is not particularly limited as long as the support structure 28 is a structure capable of supporting two or more of the respective members included in the unmanned aerial vehicle 2 in a predetermined positional relationship. The support structure 28 may be, for example, a structure capable of supporting the flight structure 22 and the pruning structure 23 in a predetermined positional relationship.

FIG. 2 illustrates, as the support structure included in the unmanned aerial vehicle 2, the support structure 28 that supports each of the control unit 21, the first flight structure 22a, the second flight structure 22b, the third flight structure 22c, the fourth flight structure 22d, the pruning structure 23, the housing structure 24, the communication unit 26, and the power source unit 27 in the predetermined positional relationship. By including the support structure 28, each of these can be supported so that they maintain the predetermined positional relationship.

[Distance Sensor]

It is preferable that the unmanned aerial vehicle 2 include a distance sensor (not illustrated) capable of measuring a distance from the unmanned aerial vehicle 2 to a target tree, humans, and/or animals, although this is not an essential aspect. This may allow the flight state control section 211 and/or the state control section 212 to measure a distance from the unmanned aerial vehicle 2 to the target tree, the humans, and/or the animals. The distance sensor is not particularly limited, and may be a distance sensor of the prior art, which is capable of measuring a distance to a target by using, for example, infrared rays, laser light, radio waves, visible light, and/or sound waves, or the like.

[Altimeter]

It is preferable that the unmanned aerial vehicle 2 include an altimeter (not illustrated) capable of measuring altitude of the unmanned aerial vehicle 2, although this is not an essential aspect. This may allow the altitude acquisition section 213 to measure altitude of the unmanned aerial vehicle 2. The altimeter is not particularly limited, and may be an altimeter of the prior art, which is capable of measuring altitude by using, for example, atmospheric pressure, radio waves, infrared rays, visible light, and/or laser light or the like.

[Positioning Unit]

It is preferable that the unmanned aerial vehicle 2 include a positioning unit (not illustrated) capable of determining a position of the unmanned aerial vehicle 2, although this is not an essential aspect. This may allow the position acquisition section 214 to acquire a position of the unmanned aerial vehicle 2. The positioning unit is not particularly limited, and may be, for example, a positioning unit that uses one or more of apparatuses capable of determining a position by using radio waves, which are exemplified by a positioning apparatus that use radio waves and are exemplified by a Global Positioning System (Global Positioning System, GPS), and a Real-time kinematic (RTK), or the like, an inertial navigation apparatus, and a radar device, or the like.

<Control Apparatus 3>

Refer back to FIG. 1. The control apparatus 3 includes a control unit 31, a storage unit 32, a communication unit 33, a display unit 34, and an input unit 35.

[Control Unit 31]

The control unit 31 includes a CPU (Central Processing Unit), a RAM (Random Access Memory), and a ROM (Read Only Memory), or the like.

The control unit 31 reads a predetermined program, and, in cooperation with the storage unit 32, the communication unit 33, the display unit 34, and/or the input unit 35, implement elements of a software configuration in the control apparatus 3, as appropriate, such as a tree image photographing section 311, a tree shape information generation section 312, a tree shape evaluation receiving section 313, a shape learning section 314, a target shape information receiving section 315, a pruning position specifying section 316, a pruning position learning section 317, an operation control section 318, and a control information learning section 319, or the like.

[Storage Unit 32]

The storage unit 32 stores data or files. The storage unit 32 has a data storage section including a member capable of storing data or files exemplified by a semiconductor memory, a recording medium, and a memory card, or the like. The storage unit 32 may have a mechanism that allows connection, via the network N, with a storage apparatus or a storage system such as a NAS (Network Attached Storage), a SAN (Storage Area Network), a cloud storage, a file server, and/or a distributed file system.

The storage unit 32 stores a control program executed by a microcomputer, a tree image table 321, and a neural network table 322, or the like.

(Tree Image Table 321)

FIG. 3 is a diagram illustrating an example of the tree image table 321. The tree image table 321 is a table that stores a tree image related to a target tree targeted for pruning. The tree image table 321 stores two or more tree images obtained by photographing the target tree. This may allow the control unit 31 to generate tree shape information of the target tree, using the two or more tree images of the target tree taken from different directions and a shape generation neural network to be described below.

It is preferable that the tree image table 321 be associated with a tree image and capable of storing a tree image ID by which the tree image can be identified. This may allow the control unit 31 to store and/or acquire the tree image using the tree image ID.

It is preferable that the tree image table 321 be associated with a tree image and capable of storing a tree ID by which a target tree associated with the target image can be identified. This may allow the control unit 31 to identify the target tree using the tree ID.

It is preferable that the tree image table 321 be able to store image information associated with a tree image. This may allow the control unit 31 to utilize the image information associated with the tree image. The image information is not particularly limited, and may be information including one or more of various information pieces related to the tree image, exemplified by information related to a photographing altitude of the tree image, information related to a photographing position of the tree image, information related to a photographer of the tree image, information related to a date of photographing of the tree image, and information related to time of photographing of the tree image, or the like.

A tree image ID "P1" of FIG. 3 stores a tree ID "T1", a tree image of a target tree identified by the tree ID "T1", and the image information related to the tree image. In addition, a tree image ID "P2" of FIG. 3 stores the tree ID "T1", a tree image of the target tree identified by the tree ID "T1", the tree image being taken from a different direction from that of the tree image identified by the tree image ID "P1", and the image information related to the tree image.

By the tree image table 321 storing two or more tree images of the target tree identified by the tree ID "T1" taken from the different directions, the control unit 31 may generate tree shape information of the target tree identified by the tree ID "T1", by using the two or more tree images of the target tree taken from the different directions and the shape generation neural network.

(Neural Network Table 322)

FIG. 4 is a diagram illustrating an example of the neural network table 322. The neural network table 322 stores a shape generation neural network N1 (corresponding to a neural network ID "N1") capable of generating tree shape information of a target tree using at least two or more tree images. This makes it possible to generate the tree shape information of the target tree by using the shape generation neural network N1.

It is preferable that the neural network table 322 be associated with a neural network, and able to store a neural network ID by which the neural network can be identified. This may allow the control unit 31 to store and/or acquire the neural network using the neural network ID.

It is preferable that the neural network table 322 store a pruning position generation neural network N2 (corresponding to a neural network ID "N2") capable of controlling the flight state of the unmanned aerial vehicle 2 and the operation of the pruning structure 23 on the basis of tree shape information and target tree information, although this is not an essential aspect. This makes it possible to control the flight state of the unmanned aerial vehicle 2 and the operation of the pruning structure 23 by using the pruning position generation neural network N2.

It is preferable that the neural network table 322 store a control information generation neural network N3 (corresponding to a neural network ID "N3") capable of controlling the flight state of the unmanned aerial vehicle 2 and the operation of the pruning structure 23 on the basis of the pruning position and a control state by the operation control section 318, although this is not an essential aspect. This makes it possible to control the flight state of the unmanned aerial vehicle 2 and the operation of the pruning structure 23 by using the control information generation neural network N3.

A format of each of the shape generation neural network N1, the pruning position generation neural network N2, and the control information generation neural network N3 is not particularly limited, and may include a data structure including information related to presence or absence of a signal outputted by an artificial neuron (which is also referred to as a node) of a neural network and/or an activation function that determines a strength of the signal; information related to a weight matrix (which is also referred to a weight parameter) that represents weighting (which is also referred to as a strength of synaptic connections or simply as a strength of connections) on a signal inputted to an artificial neuron of a neural network; information to a bias vector that provides a signal inputted to an artificial neuron of ae neural network with a reference weight (which is also referred to as a bias parameter or simply as a bias), and/or information related to a relationship of connections between artificial neurons of a neural network.

Types of neural networks stored in the neural network table 322 are not particularly limited. The neural network table 322 can store various types of neural networks of the prior art, exemplified by, for example, a forward propagation neural network (which is also referred to as a Feed Forward Neural Network or an FFNN), a convolutional neural network (which is also referred to as a Convolutional neural network, a CNN, or a ConvNet), a Deep stacking network (which is also referred to as a DSN), a RBF network (which is also referred to as a Radial basis function network), a regressive neural network (which is also referred to as a recurrent neural network or an RNN), a modular neural network (Morular neural network), or the like.

A close look at a configuration of the neural network table 322 shows that the neural network table 322 illustrated in FIG. 4 stores a "neural network ID" that can identify a neural network tied with weight matrices A and B of the neural network. Storing of a neural network ID makes it easy to acquire and update information stored in the neural network table 322. Storing of the weight matrices A and B of the neural network makes it possible to perform generation and/or evaluation using a neural network, as well as to cause a neural network to machine-learn.

A row of the neural network ID "N1" stores the shape generation neural network N1 represented by a weight matrix A1 (matrix containing elements from a111 to a179) and a weight matrix B1 (matrix containing elements from b111 to b194). By storing the weight matrix A1 and the weight matrix B1, the tree shape information generation section 312 may cause the shape generation neural network N1 to generate the tree shape information. In addition, by storing the weight matrix A1 and the weight matrix B1, the shape learning section 314 may cause the shape generation neural network N1 to machine-learn the tree shape information.

A row of the neural network ID "N2" stores the pruning position generation neural network N2 represented by a weight matrix A2 (matrix containing elements from a211 to a249) and a weight matrix B2 (matrix containing elements from b211 to b297). By storing the weight matrix A2 and the weight matrix B2, the operation control section 318 may control the flight state of the unmanned aerial vehicle 2 and the operation of the pruning structure 23 by using the pruning position generation neural network N2. In addition, by storing the weight matrix A2 and the weight matrix B2, the control information learning section 319 may cause the pruning position generation neural network N2 to machine-learn the flight state of the unmanned aerial vehicle 2 and the operation of the pruning structure 23.

A row of the neural network ID "N3" stores the control information generation neural network N3 represented by a weight matrix A3 (matrix containing elements from a211 to a249) and a weight matrix B3 (matrix containing elements from b211 to b297). By storing the weight matrix A3 and the weight matrix B3, the operation control section 318 may control the flight state of the unmanned aerial vehicle 2 and the operation of the pruning structure 23 by using the control information generation neural network N3. In addition, by storing the weight matrix A3 and the weight matrix B3, the control information learning section 319 may cause the control information generation neural network N3 to machine-learn the flight state of the unmanned aerial vehicle 2 and the operation of the pruning structure 23.

[Communication Unit 33]

Return to FIG. 1. The communication unit 33 is not particularly limited as long as the communication unit 33 is a communication unit that connects the control apparatus 3 to the network N to allow the control apparatus 3 to communicate with the unmanned aerial vehicle 2. Examples of the communication unit 33 may include a communication unit including one or more of: a wireless device which corresponds to a faint radio station for wireless operation; a wireless device which corresponds to a specified low power radio station for telemeter/tele-control; a wireless device which corresponds to a low power data communication system; a wireless device which corresponds to an unmanned mobile object image transmission system; a wireless device compatible with a mobile phone network; a Wi-Fi (Wireless Fidelity) allowed device conforming to IEEE 802.11; an optical wireless device compatible with optical wireless communications; and a wired communication apparatus compatible with wired communications.

[Display Unit 34]

The display unit 34 is not particularly limited as long as the display unit 34 is a display unit having a screen display area capable of displaying tree shape information. Examples of the display unit 34 may include a display having a touch panel, an organic EL display, a liquid crystal display, a monitor, a projector, or the like.

[Input Unit 35]

The input unit 35 is not particularly limited as long as the input unit 35 is an input unit capable of inputting a tree shape evaluation related to the tree shape information, target shape information related to a target tree, the pruning position related to a position where pruning is performed, and/or control information related to the unmanned aerial vehicle 2, or the like. A type of the input unit 35 is not particularly limited. Examples of the input unit 35 may include an input device that performs input via a touch panel, a software keyboard, a microphone that recognizes voice, a communication device that receives an input from an external apparatus, a keyboard, a mouse, or one or more buttons, an input apparatus that performs an input via one or more rotary switches, and/or an input apparatus that performs an input via one or more sticks, or the like.

By the control apparatus 3 including the input unit 35, a user may input, via the input unit 35, the tree shape evaluation, the target shape information related to a target tree, the pruning position where pruning is performed, and/or control information related to the unmanned aerial vehicle 2, or the like.

<Flowchart of Operation Control Process Performed by Control Apparatus 3>

FIG. 5 is a flowchart illustrating an example of a preferred flow of an operation control process using the control apparatus 3 of the present embodiment. Hereinafter, a description will be given of an example of a preferred procedure of the operation control process performed by the control apparatus 3, with reference to FIG. 5.

[Step S1: Acquiring a Tree Image]

In cooperation with the storage unit 32 and the communication unit 33, the control unit 31 executes the tree image photographing section 311 to acquire from the unmanned aerial vehicle 2 two or more tree images of a target tree targeted for pruning taken from different directions (step S1). The control unit 31 shifts the process to step S2. By acquiring the two or more tree images, it possible to generate the tree shape information of the target tree by using the two or more tree images and the shape generation neural network N1.

The process of acquiring two or more images from the unmanned aerial vehicle 2 includes a process of associating each of the acquired tree images with a tree image ID and storing the acquired tree images in the tree image table 321. As a result, the tree shape information generation section 312, the tree shape evaluation receiving section 313, and/or the shape learning section 314 or the like may acquire the tree images stored in the tree image table 321.

It is preferable that tree images acquired from the unmanned aerial vehicle 2 be associated with information that makes a target tree identifiable, although this is not an essential aspect. This makes it possible to associate each of acquired tree images with a tree ID identifying the target tree and store the tree image in the tree image table 321.

It is preferable that tree images acquired from the unmanned aerial vehicle 2 be associated with image information related to the tree images, although this is not an essential aspect. This makes it possible to associate each of the acquired tree images with the image information and store the tree images in the tree image table 321.

It is preferable that the process of acquiring two or more tree images from the unmanned aerial vehicle 2 include a process of controlling the flight state of the unmanned aerial vehicle 2 so that the target tree can be photographed from different directions. This may make it possible to control the flight state of the unmanned aerial vehicle 2 and acquire two or more tree images of the target tree taken from different directions.

[Step S2: Generating Tree Shape Information]

In cooperation with the storage unit 32, the control unit 31 executes the tree shape information generation section 312 and generates the tree shape information of the target tree using the two or more tree images and the shape generation neural network N1 (step S2). The control unit 31 shifts the process to step S3. Since the tree shape information generation section 312 uses the two or more images taken from different directions, a shape of the tree may be grasped. Therefore, the tree shape information generation section 312 may generate the tree shape information of the tree.

The tree shape information generation section 312 can generate tree shape information of the target tree by using the shape generation neural network N1 that can machine-learn in the shape learning section 314. Therefore, the tree shape information generation section 312 that uses the shape generation neural network N1 may generate the tree shape information that is more accurate than tree shape information generated without using the neural network that has performed machine learning.

The process of generating tree shape information preferably includes a process of controlling the display unit 34 so as to display the generated tree shape information. This may allow the tree shape evaluation receiving section 313 to receive a tree shape evaluation related to the tree shape information displayed on the display unit 34 from a user of the control apparatus 3 or the like.

The process of generating tree shape information preferably includes a process of controlling the communication unit 33 so as to transmit the generated tree shape information to the outside. This may allow the tree shape evaluation receiving section 313 to receive the tree shape evaluation from the outside that receives the tree shape information.

[Step S3] Determining Whether or Not the Tree Shape Evaluation has Been Received]

In cooperation with the storage unit 32, the control unit 31 executes the tree shape evaluation receiving section 313 to determine whether or not the tree shape evaluation has been received (step S3). If the tree shape evaluation has been received, the control unit 31 shifts the process to step S4. If the tree shape evaluation has not been received, the control unit 31 shifts the process to step S5. By determining whether or not the tree shape evaluation has been received, the shape learning section 314 may machine-learn the shape of the tree by using the received tree shape evaluation.

If the process of generating the shape tree information includes the process of controlling the display unit 34 so as to display the tree shape information, it is preferable that the process of determining whether or not tree shape evaluation has been received include a process of determining whether or not the tree shape evaluation based on information inputted via the input unit 35 has been received. This may allow the shape learning section 314 to machine-learn the shape of the tree by using the tree shape evaluation based on the information inputted via the input unit 35.

If the process of generating the tree shape information includes the process of controlling the communication unit 33 so as to transmit the generated tree shape information to the outside, it is preferable that the process of determining whether or not the tree shape evaluation has been received include a process of determining, via the communication unit 33, whether or not the tree shape evaluation has been received. This may allow the shape learning section 314 to machine-learn the shape of the tree using the tree shape evaluation received through the communication unit 33.

[Step S4: Machine-Learning the Shape of the Tree]

In cooperation with the storage unit 32, the control unit 31 executes the shape learning section 314 to cause the shape generation neural network N1 to machine-learn the tree of the shape on the basis of the tree images, the tree shape information, and the tree shape evaluation (step S4). The control unit 31 shifts the process to step S5. By causing the shape generation neural network N1 to machine-learn the shape of the tree, the shape generation neural network N1 may generate more accurate tree shape information than the neural network that does not perform machine-learning.

If the neural network table 322 stores the pruning position generation neural network N2, it is preferable that the control unit 31 perform a process related to the target shape information to be executed in step S5, step S6, and step S7. This may make it possible to more appropriately perform adjusting the shape of the tree according to the shape of the target tree.

[Step S5: Determining Whether or Not the Target Shape Information has Been Received]

In cooperation with the storage unit 32, the control unit 31 executes the target shape information receiving section 315 and determines whether or not target shape information has been received, the target shape information being related to the target shape of the pruned tree resulting from pruning of the target tree (step S5). If the target shape information has been received, the control unit 3 1shifts the process to step S6. If the target shape information has not been received, the control unit 31 shifts the process to step S8. By determining whether or not the target shape information has been received, the operation control section 318 may control the flight state of the unmanned aerial vehicle 2 and the operation of the pruning structure 23 on the basis of the target shape information.

The target shape information is not particularly limited as long as the target shape information is information related to the target shape of the pruned tree resulting from pruning of the target tree. The target shape information includes, for example, a target three-dimensional shape of a tree after being pruned. The target shape information preferably includes a pruning position of the target tree. This may allow the unmanned aerial vehicle 2 to prune the target tree on the basis of the pruning position of the target tree.

[Step S6: Controlling the Unmanned Aerial Vehicle on the Basis of the Target Shape Information]

In cooperation with the storage unit 32, the control unit 31 executes the operation control section 318 and controls the flight state of the unmanned aerial vehicle 2 and the operation of the pruning structure 23 by using the tree shape information, the target shape information, and the pruning position generation neural network N2 (step S6). The control unit 31 shifts the process to step S7.

It is preferable that the process in step S5 include a process of executing the pruning position specifying section 316 and specifying a pruning position by using the tree shape information, the target shape information, and the pruning position generation neural network N2. As a result, the pruning position may be specified more appropriately by using the pruning position generation neural network N2 that has machine-learned.

The pruning position is not particularly limited. The pruning position preferably includes a tiller pruning position where a tiller (which is also written as an offshoot or a shoot and also referred to as a basal shoot), which is a branch emerging from the root of the target tree, can be pruned. As a result, the target tree after being pruned may be a good-looking tree without any tillers. In addition, the target tree after being pruned may have improved airflow in the root. The target tree after being pruned may be able to efficiently utilize nutrients because nutrients are no longer used for tillers. The target tree after being pruned is free from propagation of diseases and pests in the tillers, and thus the propagation of diseases and pests in the target tree may be prevented.

The pruning position preferably includes a branch pruning position where crowded branches, where a number of branches overlap, can be pruned. As a result, the target tree after being pruned may become a good-looking tree without any crowded branches. In addition, airflow at a spot where the branches were crowded may be improved. The target tree after being pruned may be able to efficiently utilize nutrients as nutrients are no longer used for the crowded branches. The target tree after being pruned is free from propagation of diseases and pests in the crowded branches, and thus the propagation of diseases and pests in the target tree may be prevented.

The pruning position preferably includes an inverted branch pruning position where a branch extending in a direction of the trunk can be pruned. As a result, the target tree after being pruned may become a good-looking tree without any inverted branches. The target tree after being pruned may efficiently utilize nutrients as nutrients are no longer used for the inverted branches. The target tree after being pruned is free from propagation of diseases and pests in the inverted branches, and thus the propagation of diseases and pests in the target tree may be prevented.

The pruning position preferably includes a descending branch pruning position where a branch extending approximately downward in the direction of gravity can be pruned. As a result, the target tree after being pruned may become a good-looking tree without any descending branches. The target tree after being pruned may efficiently utilize nutrients as nutrients are no longer used for the descending branches. The target tree after being pruned is free from propagation of diseases and pests in the descending branches, and thus the propagation of diseases and pests in the target tree may be prevented.

The pruning position preferably includes a climbing branch pruning position where a branch extending approximately upward in the direction of gravity can be pruned. As a result, the target tree after being pruned may become a good-looking tree without any climbing branches. The target tree after being pruned may efficiently utilize nutrients as nutrients are no longer used for the climbing branches. The target tree after being pruned is free from propagation of diseases and pests in the climbing branches, and thus the propagation of diseases and pests in the target tree may be prevented.

The pruning position preferably includes a tangling branch pruning position where branches are entangled with each other can be pruned. As a result, the target tree after being pruned may become a good-looking tree without any tangling branches. In addition, airflow at a spot where the branches were entangled may be improved. The target tree after being pruned may efficiently utilize nutrients as nutrients are no longer used for the tangling branches. The target tree after being pruned is free from propagation of diseases and pests in the tangling branches, and thus the propagation of diseases and pests in the target tree may be prevented.

The pruning position preferably includes a long unproductive branch pruning position where a straight, long and wide branch extending approximately upward/or diagonally upward in the direction of gravity can be pruned. As a result, the target tree after being pruned may become a good-looking tree without any long unproductive branches. The target tree after being pruned may efficiently utilize nutrients as nutrients are no longer used for the long unproductive branches. The target tree after being pruned is free from propagation of diseases and pests in the long unproductive branches, and thus the propagation of diseases and pests in the target tree may be prevented.

The pruning position preferably includes a parallel branch pruning position where a branch extending approximately parallel to another branch in a periphery of the other branch can be pruned. As a result, the target tree after being pruned may become a good-looking tree without any parallel branches. In addition, airflow at a spot where the parallel branches were present may be improved. The target tree after being pruned may efficiently utilize nutrients as nutrients are no longer used for the parallel branches. The target tree after being pruned is free from propagation of diseases and pests in the parallel branches, and thus the propagation of diseases and pests in the target tree may be prevented.

In pruning, it is also important to control according to the shape of the target tree. By appropriately controlling the flight state of the unmanned aerial vehicle 2 and the pruning structure 23 according to the shape of the target tree, the shape of the tree may be adjusted to a desired shape. Such control is not easy, however.

In step S5, the target shape information receiving section 315 can receive the target shape information related to the target shape of the pruned tree resulting from pruning of the target tree. As a result, in step S6, when controlling the flight state of the unmanned aerial vehicle 2 and the pruning structure 23, the operation control section 318 can control these according to the target shape information. This control is performed by using the pruning position generation neural network N2 capable of machine-learning the pruning position of the tree in the pruning position learning section 317. Therefore, the operation control section 318 may control the flight state of the unmanned aerial vehicle 2 and the pruning structure 23 more appropriately, as compared to the case of not using the neural network that has performed machine learning. Therefore, the unmanned aerial vehicle 2 may more appropriately perform adjusting the shape of the tree according to the shape of the target tree.

[Step S7: Machine-Learning a Pruning Position]

In cooperation with the storage unit 32, the control unit 31 executes the pruning position learning section 317 to cause the pruning position generation neural network N2 to machine-learn the pruning position of the tree on the basis of the tree shape information, the target shape information, and the pruning position (step S7). The control unit 31 shifts the process to step S10. By causing the pruning position generation neural network N2 to machine-learn the pruning position of the tree, the pruning position generation neural network N2 may specify the pruning position more appropriately than the that does not perform machine-learning.

The machine learning in step S7 is preferably machine learning that learns one or more of the pruning positions exemplified by the tiller pruning position, the crowded branch pruning position, the inverted branch pruning position, the descending branch pruning position, the climbing branch pruning position, the tangling branch pruning position, the long unproductive branch pruning position, and the parallel branch pruning position. As a result, the pruning positions mentioned above may be machine-learned and the shape of the tree may be further adjusted.

[Step 8: Specifying the Pruning Position]

The control unit 31 executes the pruning position specifying section 316 and specifies the pruning position of the target tree using the tree shape information (step S8). The control unit 31 shifts the process to step S9. By specifying the pruning position of the target tree by using the tree shape information that is generated by using the shape generation neural network N1, the pruning position specifying section 316 may specify a pruning position to sever a tree branch more appropriately, as compared to the case of using tree shape information generated without using the machine learning.

The pruning position specified in step S8 preferably includes one or more of the pruning positions exemplified by the tiller pruning position, the crowded branch pruning position, the inverted branch pruning position, the descending branch pruning position, the climbing branch pruning position, the tangling branch pruning position, the long unproductive branch pruning position, and the parallel branch pruning position. As a result, the tree may be pruned at the pruning position mentioned above and the shape of the tree may be further adjusted.

It is preferable that the process of specifying the pruning position include a process of specifying a pruning position on the basis of information inputted via the input unit 35, although this is not an essential aspect. This may allow the pruning position specifying section 316 to specify the pruning position on the basis of the information inputted via the input unit 35.

It is preferable that the process of specifying the pruning position include a process of specifying a pruning position on the basis of information received via the communication unit 33, although this is not an essential aspect. This may allow the pruning position specifying section 316 to specify the pruning position on the basis of the information received via the communication unit 33.

[Step S9: Controlling the Unmanned Aerial Vehicle]

The control unit 31 executes the operation control section 318 and controls the flight state of the unmanned aerial vehicle 2 and the operation of the pruning structure 23, in accordance with the pruning position (step S9). The control unit 31 shifts the process to step S10. By controlling the flight state of the unmanned aerial vehicle 2 and the operation of the pruning structure 23, the unmanned aerial vehicle 2 can fly to a periphery of the pruning position in accordance with the specified pruning position. Then, the pruning structure 23 can be controlled and the tree can be pruned in accordance with the pruning position. Therefore, the tree may be pruned by appropriately specifying a location to sever branches of the tree, and the shape of the tree may be further adjusted.

If the neural network table 322 stores the control information generation neural network N3, the operation control section 318 preferably controls the flight state of the unmanned aerial vehicle 2 and the operation of the pruning structure 23 on the basis of the pruning position and the control information generation neural network N3.

In the pruning of trees using the unmanned aerial vehicle 2 having the pruning structure 23, it is also important to control the flight state of the unmanned aerial vehicle 2 and the operation of the pruning structure 23, in addition to appropriately specifying the position to sever the branches of the tree. If the flight state of the unmanned aerial vehicle 2 and the operation of the pruning structure 23 could be controlled more appropriately, the unmanned aerial vehicle 2 could sever the tree more in accordance with the specified position. Then, the shape of the tree may be further adjusted. Such control is not easy, however.

The control information generation neural network N3 can machine-learn in the control information learning section 319. Therefore, the operation control section 318 may control the flight state of the unmanned aerial vehicle 2 and the operation of the pruning structure 23 more appropriately than the control without using the neural network that has performed machine learning. This may allow pruning to be more aligned with the pruning position. Therefore, the unmanned aerial vehicle 2 may further adjust the shape of the tree.

If the neural network table 322 stores the control information generation neural network N3, the control unit 31 preferably performs a process of machine-learning control of the unmanned aerial vehicle which is executed in step S10.

[Step S10: Machine-Learning Control of the Unmanned Aerial Vehicle]

In cooperation with the storage unit 32, the control unit 31 executes the control information learning section 319 and causes the control information generation neural network N3 to machine-learn the flight state of the unmanned aerial vehicle 2 and the operation of the pruning structure 23 on the basis of the pruning position and a state of the control by the operation control section (step S10). The control unit 31 ends the operation control process and repeats the processes from step S1 to S10.

By causing the control information generation neural network N3 to machine-learn the flight state of the unmanned aerial vehicle 2 and the operation of the pruning structure 23, the operation control section 318 using the control information generation neural network N3 may control the flight state of the unmanned aerial vehicle 2 and the operation of the pruning structure 23 more appropriately, as compared to the case of using the neural network that does not perform machine-learning. This may allow pruning to be more aligned with the pruning position. Therefore, the unmanned aerial vehicle 2 may further adjust the shape of the tree.

The control apparatus 3 is a control apparatus that can appropriately specify the pruning position to prune branches of the tree by performing the processes according to step S1 to step S10, thereby being able to further adjust the shape of the tree. Therefore, the control apparatus 3 can control the unmanned aerial vehicle 2 having the photographing apparatus 25 capable of photographing trees and the pruning structure 23 capable of pruning trees.

Therefore, according to the unmanned aerial vehicle system 1 of the present embodiment, it is possible to provide an unmanned aerial vehicle system capable of pruning a tree by appropriately specifying a pruning position to prune a branch of the tree and further adjusting a shape of the tree.

[Flowchart of a State Control Process Performed by the Control Unit 21]

FIG. 6 is a flowchart illustrating an example of a preferred flow of a state control process performed by the control unit 21 in the present embodiment. Hereinafter, a description will be given of an example of a preferred procedure of the state control process performed by the control unit 21, with reference to FIG. 6.

It is preferable that the state control process include a housing and landing process performed in step S11, although this is not an essential aspect.

[Step S11: Housing and Landing Process]

In cooperation with the flight structure 22, the pruning structure 23, and/or the housing structure 24, or the like, the control unit 21 performs a housing and landing process that executes the flight state control section 211, the state control section 212, the position acquisition section 214, or the like, houses the pruning structure 23 in the housing structure 24, and controls the flight state of the unmanned aerial vehicle 2 to a landing state via control of the flight structure 22 (step S11). The control unit 21 shifts the process to step S12. The housing and landing process performed in step S11 will be described below in more detail with reference to FIG. 7.

By the control unit 21 performing the housing and landing process, the pruning structure 23 may be housed in the housing structure 24, and the flight state of the unmanned aerial vehicle 2 may be controlled to the landing state via the control of the flight structure 22, in various cases where safety is further requested, such as a case where a strength of a control signal related to the control of the unmanned aerial vehicle 2 which is received from the outside is weaker than a predetermined strength, a case where a distance from the unmanned aerial vehicle 2 to a human in a periphery of the unmanned aerial vehicle 2 is equal to or shorter than a specific distance, a case where a distance from the unmanned aerial vehicle 2 to an animal in the periphery of the unmanned aerial vehicle 2 is equal to or shorter than the specific distance, and/or a case where the unmanned aerial vehicle 2 is located at a position different from an exposable area where the pruning structure 23 can be exposed, or the like. This may enhance the safety of the unmanned aerial vehicle 2.

[Step S12: Determining Whether or Not Landing is in Progress]

The control unit 21 executes the state control section 212 to determine whether or not the unmanned aerial vehicle 2 is in the process of landing (step S12). If the unmanned aerial vehicle 2 is in the process of landing, the control unit 21 shifts the process to step S15. If the unmanned aerial vehicle 2 is not in the process of landing, the control unit 21 shifts the process to the step S13. By determining whether or not the unmanned aerial vehicle 2 is in the process of landing, the pruning structure 23 may be housed in the housing structure 24 if the unmanned aerial vehicle 2 is in the process of landing. The state control section 212 controls a state of the pruning structure 23 to a housed state at the time of landing. Consequently, it may be possible to prevent humans or the like from being injured by the pruning structure 23 during landing.

A method of determining whether or not the unmanned aerial vehicle 2 is in the process of landing is not particularly limited. Examples of means for determining whether or not the unmanned aerial vehicle 2 is in the process of landing may include a method of determining that the unmanned aerial vehicle is in the process of landing when a command to land the unmanned aerial vehicle 2 is received, and/or a method of determining that the unmanned aerial vehicle 2 is in the process of landing when altitude of the unmanned aerial vehicle 2 is equal to or lower than predetermined altitude and when a state in which the altitude is lowered has continued for a predetermined period of time or longer, or the like.

It is preferable that the state control process include a process executed in step S13 of determining whether or not the altitude is within a predetermined range, although this is not an essential aspect.

[Step S13: Determining Whether or Not the Altitude is in a Predetermined Range]

In cooperation with the altimeter, the control unit 21 executes the altitude acquisition section 213 and determines whether or not the altitude of the unmanned aerial vehicle 2 is within the predetermined range (step S13). If the altitude of the unmanned aerial vehicle 2 is within the predetermined range, the control unit 21 shifts the process to step S14. If the altitude of the unmanned aerial vehicle 2 is not in the predetermined range, the control unit 21 shifts the process to step S15. By determining whether or not the altitude of the unmanned aerial vehicle 2 is within the predetermined range, the pruning structure 23 may be housed in the housing structure 24 when the altitude of the unmanned aerial vehicle 2 is not within the predetermined range.

If the unmanned aerial vehicle 2 is close to the ground, more specifically, when the altitude of the unmanned aerial vehicle 2 is low, there is a possibility that the unmanned aerial vehicle 2 may collide with humans and/or animals. In addition, when the altitude of the unmanned aerial vehicle 2 is low, there is a possibility that the unmanned aerial vehicle 2 may collide with a property on the ground exemplified by houses, agricultural products, and automobiles, or the like. The unmanned aerial vehicle 2 including the pruning structure 23 has room for further improvement in terms of enhancing the safety when the altitude of the unmanned aerial vehicle 2 is low.

In the unlikely event that the unmanned aerial vehicle 2 flying over a high altitude loses control and crashes, a speed at which the unmanned aerial vehicle 2 falls is faster than a case where the altitude of the unmanned aerial vehicle 2 is low. Consequently, the adverse effect given by the unmanned aerial vehicle 2 on humans or the like when the unmanned aerial vehicle 2 flying over a high altitude loses control of the flight state and crashes and the pruning structure 23 collides with the humans or the like may be larger than the case where the altitude of the unmanned aerial vehicle 2 is low. Therefore, the unmanned aerial vehicle 2 including the pruning structure 23 has room for further improvement in terms of enhancing the safety when the altitude of the unmanned aerial vehicle 2 is high.

If the altitude of the unmanned aerial vehicle 2 is higher than height of the target tree by a certain amount or more, a distance from the unmanned aerial vehicle 2 to the target tree is farther than a distance at which the pruning structure 23 can prune the tree. If the distance from the unmanned aerial vehicle 2 to the target tree is farther than the distance at which the tree can be pruned, the pruning structure 23 does not prune the tree. Therefore, the unmanned aerial vehicle 2 including the pruning structure 23 also has room for further improvement in terms of enhancing the safety when the altitude of the unmanned aerial vehicle 2 is higher than the height of the tree by the certain amount or more.

If it is determined whether or not the altitude of the unmanned aerial vehicle 2 is within the predetermined range, and when the altitude is not in the predetermined range, the state control section 212 controls the state of the pruning structure 23 to the housed state by the process executed in step S16 to be described below. Therefore, it may be possible to enhance the safety when the altitude of the unmanned aerial vehicle 2 is low and the safety when the altitude of the unmanned aerial vehicle 2 is high.

It is preferable that the state control process include a series of processes of determining whether the distance to the target tree is equal to or shorter than a predetermined distance and of controlling the state of the pruning structure 23 to the exposed state, which are performed in step S14 and step S15, although this is not an essential aspect.

[Step S14: Determining Whether or Not the Distance to the Target Tree is Equal to or Shorter Than the Predetermined Distance]

In cooperation with the distance sensor, the control unit 21 executes the state control section 212 and determines whether or not the distance from the unmanned aerial vehicle 2 to the target tree is equal to or shorter than the predetermined distance (step S14). If the distance is equal to or shorter than the predetermined distance, the control unit 21 shifts the process to step S15. If the distance is not equal to or shorter than the predetermined distance, the control unit shifts the process to step S16.

If the distance from the unmanned aerial vehicle 2 to the target tree is equal to or shorter than the predetermined distance, the state control section 212 may control the state of the pruning structure 23 to the exposed state in which the pruning structure 23 is exposed outside of the housing structure 24, by the process performed in step S15 to be described below. This may allow the pruning structure 23 to prune a tree in the exposed state.

If the distance from the unmanned aerial vehicle 2 to the target tree is equal to or longer than the predetermined distance, the state control section 212 may control the state of the pruning structure 23 to the housed state in which the pruning structure 23 is housed inside the housing structure 24, by the process performed in step S16 to be described below. This may further enhance the safety of the unmanned aerial vehicle 2 when trees are not pruned.

[Step S15: Controlling the State of the Pruning Structure to the Exposed State]

In cooperation with the pruning structure 23 and/or the housing structure 24, the control unit 21 executes the state control section 212 and controls the state of the pruning structure 23 to the exposed state (step S15). The control unit 21 ends the state control process and repeats the processes from step S11 to step S16. By controlling the state of the pruning structure 23 to the exposed state, the pruning structure 23 may prune trees in the exposed state.

[Step S16: Controlling the State of the Pruning Structure to the Housed State]

In cooperation with the pruning structure 23 and/or the housing structure 24, the control unit 21 executes the state control section 212 and controls the state of the pruning structure 23 to the housed state (step S16). The control unit 21 ends the state control process and repeats the processes from step S11 to step S16. By controlling the state of the pruning structure 23 to the housed state, the safety of the unmanned aerial vehicle 2 including the pruning structure 23 may be enhanced.

[Flowchart of the Housing and Landing Process]

FIG. 7 is a flowchart illustrating an example of a preferred flow of the housing and landing process performed in step S6 of FIG. 6. Hereinafter, a description will be given of an example of a preferred procedure of the housing and landing process, with reference to FIG. 7.

The housing and landing process includes one or more of a process executed in step S21 of determining whether or not a strength of a control signal is weaker than a predetermined strength, a process executed in step S22 of determining whether or not a distance to humans or the like is equal to or shorter than a specific distance, and a process executed in step S23 of determining whether or not a position is different from the exposable area.

[Step S21: Determining Whether or Not the Strength of the Control Signal is Weaker Than the Predetermined Strength]

In cooperation with the communication unit 26, the control unit 21 executes the state control section 212 and determines whether or not the strength of the control signal related to the control of the unmanned aerial vehicle 2 is weaker than the predetermined strength (step S21). If the strength of the control signal is weaker than the predetermined strength, the control unit 21 shifts the process to step S24. If the strength of the control signal is not weaker than the predetermined strength, the control unit shifts the process to step S22.

By controlling the unmanned aerial vehicle 2 with a control signal from the outside, the safety of the unmanned aerial vehicle 2 may be enhanced, as compared to a case of performing autonomous flight without using the control signal from the outside. However, there may be some cases where the unmanned aerial vehicle 2 cannot receive a control signal from the outside with a strength equal to or higher than the predetermined strength due to deterioration of a communication state or the like. If the unmanned aerial vehicle 2 cannot receive the control signal from the outside with the strength equal to higher than the predetermined strength, there is a possibility that the unmanned aerial vehicle 2 cannot be controlled by the control signal from the outside. Therefore, the unmanned aerial vehicle 2 including the pruning structure 23 has room for further improvement in enhancing the safety when the control signal from the outside cannot be received with the strength equal to or higher than the predetermined strength.

By determining whether or not the strength of the control signal is weaker than the predetermined strength, when a strength of the control signal related to the control of the unmanned aerial vehicle 2 received from the outside is weaker than the predetermined strength, it may be possible to control the state of the pruning structure 23 to the housed state and control the flight state the unmanned aerial vehicle 2 to the landing state, by the processes to be executed in step S24 and step S25 to be described below. This may further enhance the safety when the control signal from the outside cannot be received with the strength equal to or higher than the predetermined strength.

[Step S22: Determining Whether or Not the Distance to Humans or the Like is Equal to or Shorter than a Specific Distance]

In cooperation with the distance sensor, the control unit 21 executes the state control section 212 and determines whether or not the distance from the unmanned aerial vehicle 2 to humans and/or animals is equal to or shorter than a specific distance (step S22). If the distance is equal to or shorter than the specific distance, the control unit 21 shifts the process to step S24. If the distance is not equal to or shorter than the specific distance, the control unit 21 shifts to the step S23.

If there is a human in the periphery of the flying unmanned aerial vehicle 2, the human may jump out into a path of the unmanned aerial vehicle 2 and collide with the flying unmanned aerial vehicle 2 and/or the pruning structure 23. If there is an animal exemplified by a pet and a farm animal or the like, in the periphery of the flying unmanned aerial vehicle 2, the animal may jump out into the path of the flying unmanned aerial vehicle 2 and collide with the unmanned aerial vehicle 2 and/or the pruning structure 23. The possibility of the flying unmanned aerial vehicle 2 injuring a human and/or an animal by rotating propellers and/or rotors is higher than the unmanned aerial vehicle 2 not in flight. Therefore, he unmanned aerial vehicle 2 including the pruning structure 23 has room for further improvement in terms of enhancing the safety when there are humans and/or animals in the periphery of the unmanned aerial vehicle 2.

If the distance from the unmanned aerial vehicle 2 to the humans and/or the animals in the periphery of the unmanned aerial vehicle 2 is equal to or shorter than the specific distance, it may be possible to control the state of the pruning structure 23 to the housed state and control the flight state of the unmanned aerial vehicle 2 to the landing state, by processes performed in step 24 and step S25 to be described below. This may further enhance the safety in the case where the distance from the unmanned aerial vehicle 2 to the humans and/or the animals in the periphery of the unmanned aerial vehicle 2 is equal to or shorter than the specific distance.

[Step S23: Determining Whether or Not the Position is Different from the Exposable Area]

In cooperation with the positioning unit, the control unit 21 executes the position acquisition section 214 and determines Whether or Not the position of the unmanned aerial vehicle 2 is different from the exposable area where the pruning structure 23 can be exposed (step 23). If the position is different from the exposable area, the control unit 21 shifts the process to step S24. If the position is not different from the exposable area, the control unit 21 ends the housing and landing process and shifts the process to step S12.

If the unmanned aerial vehicle 2 is located at a position different from a predetermined area where the target tree is located, the pruning structure 23 does not prune the target tree. Therefore, the unmanned aerial vehicle 2 including the pruning structure 23 has room for further improvement in terms of enhancing the safety when the unmanned aerial vehicle 2 is located at the position different from the predetermined area.

In the case of the unmanned aerial vehicle 2 that receives a control signal related to the control of the unmanned aerial vehicle 2 from the outside, in general, the strength of the control signal becomes weaker, as the distance to the unmanned aerial vehicle 2 from the outside from which the control signal is transmitted increases. In addition, if there is a shield exemplified by terrain, a building, or the like between the outside from which the control signal is transmitted and the unmanned aerial vehicle 2, the strength of the control signal may degrade. Therefore, an area where the unmanned aerial vehicle 2 can receive the control signal from the outside with the strength equal to or higher than the predetermined strength may be limited to a specific area that is defined by a distance from the outside from which the control signal is transmitted and/or the shield, or the like.

If the control signal from the outside cannot be received with the strength equal to or higher than the predetermined strength, there is a possibility that the unmanned aerial vehicle 2 cannot be controlled with the control signal from the outside. Therefore, there is a possibility that unmanned aerial vehicle 2 cannot receive the control signal from the outside with the strength equal to or higher than the predetermined strength, when the unmanned aerial vehicle 2 is located at a position different from the specific area where the control signal can be received with the strength equal to or higher than the predetermined strength. Therefore, the unmanned aerial vehicle 2 including the pruning structure 23 and receiving the control signal from the outside has room for further improvement in terms of enhancing the safety of the unmanned aerial vehicle 2 when the unmanned aerial vehicle 2 is located at a position different from the specific area.

In order to enhance the safety related to flight of the unmanned aerial vehicle, the area where the flight of the unmanned aerial vehicle is prohibited is defined by various laws and regulations related to the flight of the unmanned aerial vehicle (for example, Act on Prohibition of Flight of Small Unmanned Aerial Vehicles, etc. Over Areas Around Important Facilities (Act No. 9 of Heisei 28 (2016), the notification that defines the no-fly zone for unmanned aerial vehicles (Notice No. 461 of the Ministry of Land, Infrastructure, Transport and Tourism in Reiwa 1 (2019)). In the no-fly zone where flight is prohibited by the laws and regulations, or the like, it is defined that flight is allowed only when a permit is granted. An area where the unmanned aerial vehicle 2 including the pruning structure 23 is allowed to fly with the pruning structure 23 exposed may be restricted by the laws and regulations, or the like.

Flying in compliance with the laws and regulations or the like may enhance the safety of the unmanned aerial vehicle 2. The unmanned aerial vehicle 2 including the pruning structure 23 has room for further improvement in terms of enhancing the safety when such unmanned aerial vehicle 2 is located at the position different from the area where the unmanned aerial vehicle 2 is allowed to fly.

For example, it may be possible to define the exposable area where the pruning structure 23 can be exposed, on the basis of a predetermined area where the target tree is located, the specific area where the control signal from the outside can be received with the strength equal to or higher than the predetermined strength, and/or the area where flight is allowed based on the laws and regulations or the like. Then, it may be possible to control the pruning structure 23 to the housed state and control the flight state of the unmanned aerial vehicle 2 to the landing state by processes performed in step S24 and step S25 to be described below when the unmanned aerial vehicle 2 is located at the position different from the exposable area. This may further enhance the safety when the unmanned aerial vehicle 2 is located at the position different from the exposable area.

[Step S24: Controlling the State of the Pruning Structure to the Housed State]

In cooperation with the pruning structure 23 and/or the housing structure 24, the control unit 21 executes the state control section 212 and controls the state of the pruning structure 23 to the housed state (step S24). When the pruning structure is housed inside the housing structure 24, the control unit 21 shifts the process to step S25. By controlling the state of the pruning structure 23 to the housed state, the safety of the unmanned aerial vehicle 2 including the pruning structure 23 may be enhanced.

[Step S25: Controlling the Flight State to the Landing State]

In cooperation with the pruning structure 23 and/or the housing structure 24, the control unit 21 executes the flight state control section 211 and controls the flight state of the unmanned aerial vehicle 2 to the landing state (step S24). The control unit 21 shifts the process to step S25. By controlling the flight state of the unmanned aerial vehicle 2 to the landing state, the safety of the unmanned aerial vehicle 2 including the pruning structure 23 may be enhanced.

According to the processes performed in step S24 and S25, since the flight state control section 211 controls the unmanned aerial vehicle 2 to the landing state when the pruning structure 23 is housed inside the housing structure 24, it may be possible to minimize flight hours of the unmanned aerial vehicle 2 in a case where predetermined conditions are met in step S21, step S22, and/or step S23. This may further enhance the safety of the unmanned aerial vehicle 2.

Usage Example

Figure 8:
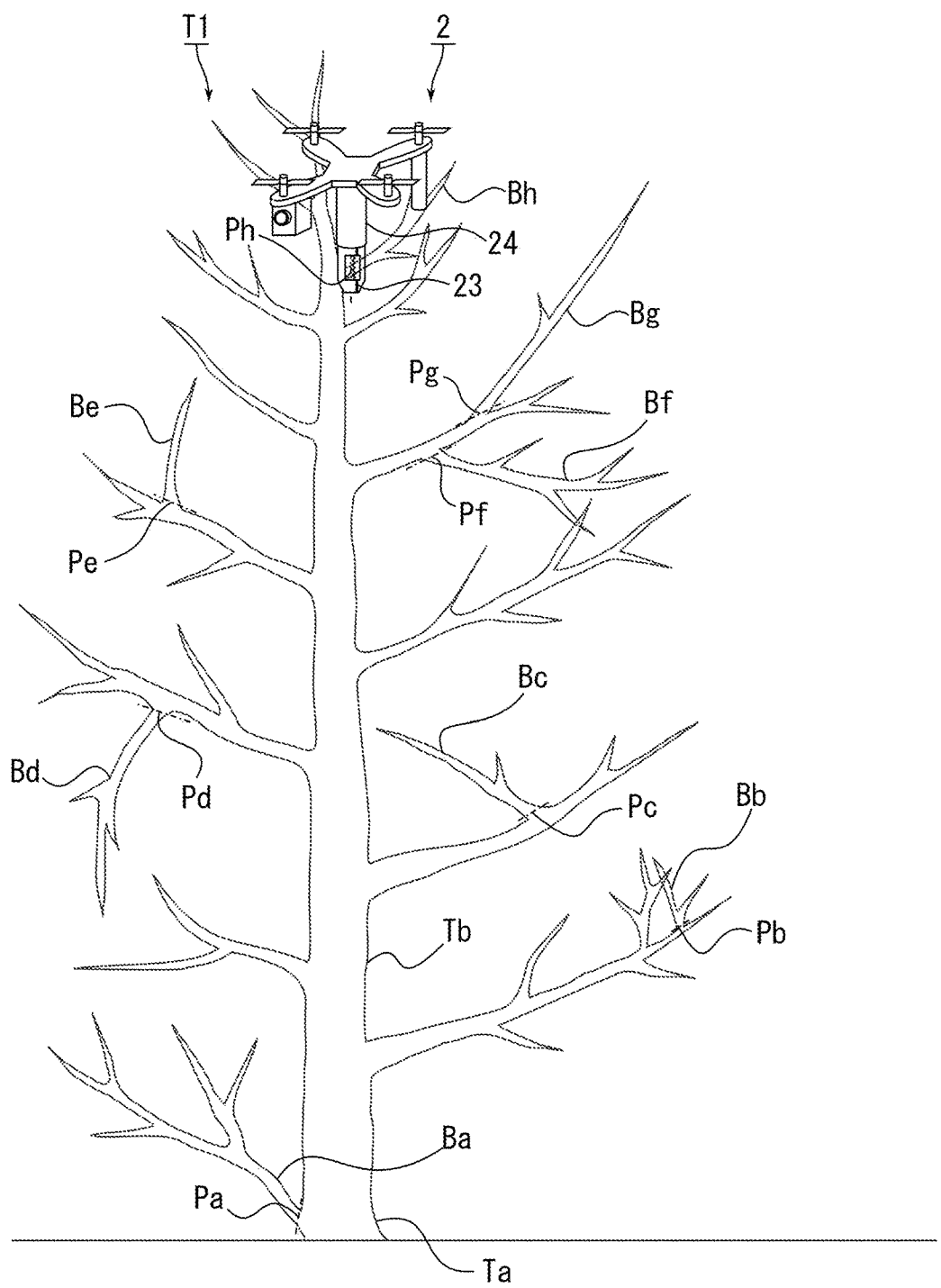
FIG. 8 is a schematic pattern diagram illustrating an example of tree pruning using the unmanned aerial vehicle system 1 of the present embodiment.
Figure 9:
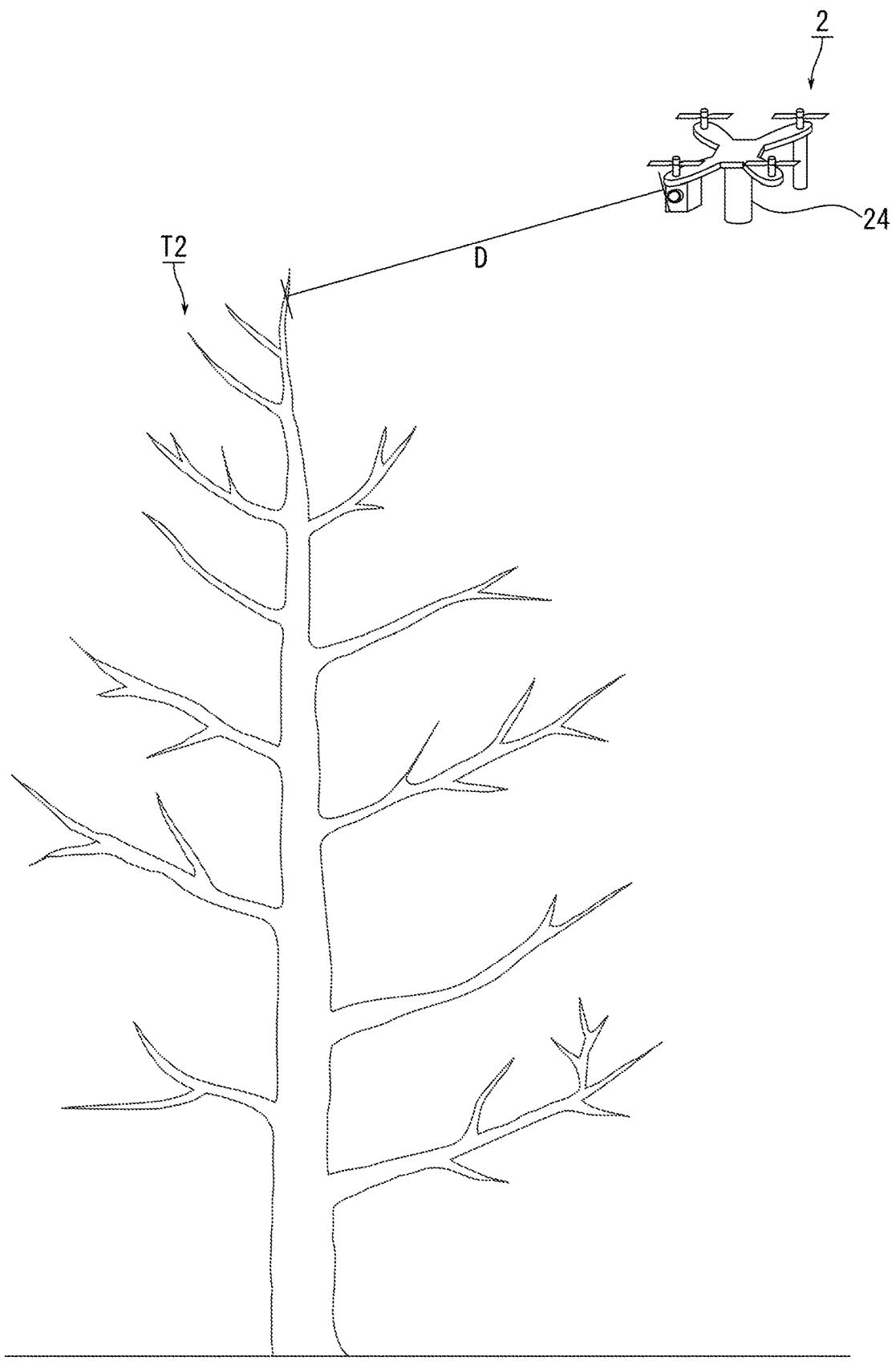
FIG. 9 is a schematic pattern diagram illustrating an example of state control that enhances safety in the unmanned aerial vehicle 2 of the present embodiment.

FIG. 8 is a schematic pattern diagram illustrating an example of tree pruning using the unmanned aerial vehicle system 1 of the present embodiment. FIG. 9 is a schematic pattern diagram illustrating an example of the state control that enhances the safety in the unmanned aerial vehicle 2 of the present embodiment. Hereinafter, a description will be given of a usage example of the unmanned aerial vehicle system 1 of the present embodiment with reference to FIG. 8 and/or FIG. 9, as appropriate.

<Acquisition of Tree Images>

The user starts using the unmanned aerial vehicle system 1. The control apparatus 3 directs the unmanned aerial vehicle 2 to photograph a target tree T1 targeted for pruning via the network N. The control apparatus 3 controls the flight state of the unmanned aerial vehicle 2 so that the target tree T1 can be photographed from different directions, and acquires two or more tree images obtained by photographing the target tree T1 from different directions. The control apparatus 3 generates tree shape information on the basis of the two or more tree images and controls the display unit 34 so as to display the generated tree shape information.

<Transmission of a Tree Shape Evaluation>

The user performs tree shape evaluation related to the tree shape information displayed on the display unit 34 and transmits the tree shape evaluation to the control apparatus 3 via the input unit 35. The control apparatus 3 machine-learns the shape of the tree using the tree shape evaluation.

<Transmission of Target Shape Information>

The user transmits target shape information related to a target shape of a pruned tree T2 resulting from pruning of the target tree T1 to the control apparatus 3 via the input unit 35.

<Pruning the Target Tree>

The unmanned aerial vehicle 2 moves to the periphery of the target tree T1. As a result, the distance from the unmanned aerial vehicle 2 to the target tree T1 becomes equal to or shorter than the predetermined distance. Therefore, the unmanned aerial vehicle 2 controls the pruning structure 23 to the exposed state. The unmanned aerial vehicle 2 prunes the target tree T1 on the basis of the target shape information.

FIG. 8 is a schematic pattern diagram illustrating the example of tree pruning using the unmanned aerial vehicle system 1 of the present embodiment. The target tree T1 has branches B that need pruning (a tiller B a, a crowded branch Bb, an inverted branch Bc, a descending branch Be, a climbing branch Be, a tangling branch Bf, a long unproductive branch Bg, and a parallel branch Bh, or the like). The control apparatus 3 controls the flight state of the unmanned aerial vehicle 2 and the pruning structure 23 so as to prune one or more of the branches B that need pruning at a pruning position P (a tiller pruning position Pa, a crowded branch pruning position Pb, an inverted branch pruning position Pc, a descending branch pruning position Pd, a climbing branch pruning position Pe, a tangling branch pruning position Pf, a long unproductive branch pruning position Pg, and a parallel branch pruning position Ph, or the like).

By pruning the tiller Ba, which is a branch emerging from the root Ta of the target tree T1, at the tiller pruning position Pa, the target tree T1 after being pruned may become a good-looking tree without the tiller Ba. In addition, the target tree T1 after being pruned may have improved airflow at the root Ta. The target tree T1 after being pruned may be able to efficiently utilize nutrients as nutrients are no longer used for the tiller Ba. The target tree T1 after being pruned is free from propagation of diseases and pests in the tiller Ba, and thus the propagation of diseases and pests in the target tree may be prevented.

By pruning the crowded branch Bb, in which a number of branches overlap, at the crowded branch pruning position Pb, the target tree T1 after being pruned may become a good-looking tree without the crowded branch Bb. In addition, airflow at a spot where the crowded branch Bb was present may be improved. The target tree T1 after being pruned may be able to efficiently utilize nutrients as nutrients are no longer used for the crowded branch Bb. The target tree T1 after being pruned is free from propagation of diseases and pests in the crowded branch Bb, and thus the propagation of diseases and pests in the target tree may be prevented.

By pruning the inverted branch Bc, which extends to the direction of a trunk Tb, at the inverted branch pruning position Pc, the target tree T1 after being pruned may become a good-looking tree without the inverted tree Bc. The target tree T1 after being pruned may be able to efficiently utilize nutrients as nutrients are no longer used for the inverted branch Bc. The target tree T1 after being pruned is free from propagation of diseases and pests in the inverted branch Bc, and thus the propagation of diseases and pests in the target tree may be prevented.

By pruning the descending branch Bd, which extends approximately downward to the direction of gravity, at the descending branch pruning position Pd, the target tree T1 after being pruned may become a good-looking tree without the descending tree Bd. The target tree T1 after being pruned may be able to efficiently utilize nutrients as nutrients are no longer used for the descending branch Bd. The target tree T1 after being pruned is free from propagation of diseases and pests in the descending branch Bd, and thus the propagation of diseases and pests in the target tree may be prevented.

By pruning the climbing branch Be, which extends approximately upward to the direction of gravity, at the climbing branch pruning position Pe, the target tree T1 after being pruned may become a good-looking tree without the climbing tree Be. The target tree T1 after being pruned may be able to efficiently utilize nutrients as nutrients are no longer used for the climbing branch Be. The target tree T1 after being pruned is free from propagation of diseases and pests in the climbing branch Be, and thus the propagation of diseases and pests in the target tree may be prevented.

By pruning the tangling branch Bf, which is entangled with other branches, at the tangling branch pruning position Pf, the target tree T1 after being pruned may become a good-looking tree without the tangling branch Bf. In addition, airflow at a spot where the tangling branch Bf was present may be improved. The target tree T1 after being pruned may be able to efficiently utilize nutrients as nutrients are no longer used for the tangling branch Bf. The target tree T1 after being pruned is free from propagation of diseases and pests in the tangling branch Bf, and thus the propagation of diseases and pests in the target tree may be prevented.

By pruning the long unproductive branch Bg, which is a straight, long and wide branch extending approximately upward/or diagonally in the direction of gravity, at the long unproductive branch pruning position Pg, the target tree T1 after being pruned may become a good-looking tree without the long unproductive branch Bg. The target tree T1 after being pruned may be able to efficiently utilize nutrients as nutrients are no longer used for the long unproductive branch Bg. The target tree T1 after being pruned is free from propagation of diseases and pests in the long unproductive branch Bg, and thus the propagation of diseases and pests in the target tree may be prevented.

By pruning the parallel branch Bh, which extends approximately parallel to other branches in the periphery of the other branches, at the parallel branch pruning position Ph, the target tree T1 after being pruned may become a good-looking tree without the parallel tree Bh. In addition, airflow at a spot where the parallel branch Bh was present may be improved. The target tree T1 after being pruned may be able to efficiently utilize nutrients as nutrients are no longer used for the parallel branch Bh. The target tree T1 after being pruned is free from propagation of diseases and pests in the parallel branch Bh, and thus the propagation of diseases and pests in the target tree may be prevented.

The control apparatus 3 controls the flight state of the unmanned aerial vehicle 2 and the pruning structure 23 so as to prune one or more of the branches B that need pruning, exemplified by the tiller Ba, the crowded branch Bb, the inverted branch Bc, the descending branch Be, the climbing branch Be, the tangling branch Bf, the long unproductive branch Bg, and the parallel branch Bh, or the like at the pruning position P exemplified by the tiller pruning position Pa, the crowded branch pruning position Pb, the inverted branch pruning position Pc, the descending branch pruning position Pd, the climbing branch pruning position Pe, the tangling branch pruning position Pf, the long unproductive branch pruning position Pg, and the parallel branch pruning position Ph, or the like.

By controlling the flight state of the unmanned aerial vehicle 2 so that one or more of the branches B that need pruning is pruned, the target tree T1 becomes the pruned tree T2, in which one or more of the branches B that need pruning have been pruned. Therefore, the target tree T1 can be made good-looking. In addition, airflow may be improved in the target tree T1. The target tree T1 may be able to efficiently utilize nutrients. Growth of the target tree T1 may be promoted. In addition, propagation of diseases and pests in the target tree may be prevented.

<Movement of the Unmanned Aerial Vehicle 2>

FIG. 9 is a schematic pattern diagram illustrating an example of the state control that enhances the safety in the unmanned aerial vehicle 2 of the present embodiment. The user who uses the unmanned aerial vehicle 2 directs the unmanned aerial vehicle 2 to move, via the control apparatus 3. The unmanned aerial vehicle 2 moves. A distance D from the unmanned aerial vehicle 2 after being moved to the pruned tree T2 becomes larger than the predetermined distance. The unmanned aerial vehicle 2 controls the pruning structure 23 to enter the housed state. The pruning structure 23 is housed in the housing structure 24.

In the example illustrated in FIG. 9, the pruning structure 23 is housed inside the housing structure 24. Therefore, when the unmanned aerial vehicle 2 is viewed from the outside, the unmanned aerial vehicle 2 is in a state in which the pruning structure 23 housed inside the housing structure 24 is not visible. This may further enhance the safety of the unmanned aerial vehicle 2 when trees are not pruned.

<Landing of the Unmanned Aerial Vehicle 2>

The user who uses the unmanned aerial vehicle system 1 directs the unmanned aerial vehicle 2 to land, via the control apparatus 3. The unmanned aerial vehicle 2 controls the pruning structure 23 to enter the housed state. The pruning structure 23 is housed in the housing structure 24. This may make it possible to prevent humans or the like from being injured by the pruning structure 23 during landing.

<Case where the Altitude of the Unmanned Aerial Vehicle 2 is Not Within the Predetermined Range>

If the altitude of the unmanned aerial vehicle 2 is not within the predetermined range, the unmanned aerial vehicle 2 controls the pruning structure 23 to enter the housed state. The control unit 21 controls the pruning structure 23 to house the pruning structure 23 in the housing structure 24. This may enhance the safety when the altitude of the unmanned aerial vehicle 2 is low and the safety when the altitude of the unmanned aerial vehicle 2 is high.

<When the Strength of the Control Signal is Weaker than the Predetermined Strength>

When the strength of the control signal is weaker than the predetermined strength, the unmanned aerial vehicle 2 controls the pruning structure 23 to enter the housed state. The control unit 21 controls the pruning structure 23 to house the pruning structure 23 in the housing structure 24. Then, the control unit 21 controls the flight state of the unmanned aerial vehicle 2 to the landing state. This may further enhance the safety when the control signal from the outside cannot be received with the strength equal to or higher than the predetermined strength.

<When the Distance from the Unmanned Aerial Vehicle 2 to Humans or the Like is Equal to or Shorter Than the Specific Distance>

If the distance from the unmanned aerial vehicle 2 to humans or the like is equal to or shorter than the specific distance, the unmanned aerial vehicle 2 controls the pruning structure 23 to enter the housed state. The control unit 21 controls the pruning structure 23 to house the pruning structure 23 in the housing structure 24. Then, the control unit 21 controls the flight state of the unmanned aerial vehicle 2 to the landing state. This may further enhance the safety when the distance from the unmanned aerial vehicle 2 to the humans and/or the animals in the periphery of the unmanned aerial vehicle 2 is equal to or shorter than the specific distance.

<When the Position of the Unmanned Aerial Vehicle 2 is Different from the Exposable Area>

When the unmanned aerial vehicle 2 is located at the position different from the exposable area, the unmanned aerial vehicle 2 controls the pruning structure 23 to enter the housed state. The control unit 21 controls the pruning structure 23 to house the pruning structure 23 in the housing structure 24. Then, the control unit 21 controls the flight state of the unmanned aerial vehicle 2 to the landing state. This may further enhance the safety when the unmanned aerial vehicle 2 is located at the position different from the exposable area.

Although a description has been given of the embodiments of the present invention, the present invention is not limited to the foregoing embodiments. In addition, the effects described in the foregoing embodiments simply recite the most preferable effects resulting from the present invention, and the effects of the present invention shall not be limited to those described in the foregoing embodiments. In addition, the foregoing embodiments are set forth in detail to describe the present invention in an easy-to-understand manner, and shall not be necessarily limited to those having all configurations which were described.

DESCRIPTION OF THE REFERENCE NUMERALS

1 Unmanned aerial vehicle system
2 Unmanned aerial vehicle
21 Control unit
211 Flight state control section
212 State control section
213 Altitude acquisition section
214 Position acquisition section
22 Flight structure
221 Drive section
222 Rotary wing
23 Pruning structure 24 Housing structure
25 Photographing apparatus
26 Communication unit
27 Power source unit
28 Support structure
3 Control apparatus
31 Control unit
311 Tree image photographing section
312 Tree shape information generation section
313 Tree shape evaluation receiving section
314 Shape learning section
315 Target shape information receiving section
316 Pruning position specifying section
317 Pruning position receiving section
318 Operation control section
319 Control information learning section
32 Storage unit
321 Tree image table
322 Neural network table
33 Communication unit
34 Display unit
35 Input unit
B Trees that need pruning
D Distance
N Network
N1 Shape generation neural network
N2 Pruning position generation neural network
N3 Control information generation network
P Pruning position
T1 Target tree
T2 Tree after being pruned

The invention claimed is:

1. An unmanned aerial vehicle comprising:
a central processing unit;
a non-transitional computer readable storage medium storing computer readable program instructions to control a flight state of the unmanned aerial vehicle and a pruning state of the unmanned aerial vehicle;
a pruning structure capable of pruning a tree;
a housing structure capable of housing the pruning structure inside;
wherein, when the computer readable program instructions are executed by the central processing unit:
the flight state of the unmanned aerial vehicle is controlled by a flight state control section;
the pruning state is controlled by a pruning state control section that controls the state of the pruning structure between a housed state in which the pruning structure is housed inside the housing structure and an exposed state in which the pruning structure is exposed to the outside of the housing structure; and,
the pruning state control section controls the state of the pruning structure to the housed state during landing processes.

2. The unmanned aerial vehicle according to claim 1, wherein the pruning state control section:
controls the state of the pruning structure to the exposed state when a distance from the unmanned aerial vehicle to a target tree to be pruned is less than or equal to a predetermined distance, and
controls the state of the pruning structure to the housed state when a distance from the unmanned aerial vehicle to the target tree is greater than the predetermined distance.

3. An unmanned aerial vehicle comprising:
a central processing unit;
a non-transitional computer readable storage medium storing computer readable program instructions to control a flight state of the unmanned aerial vehicle and a pruning state of the unmanned aerial vehicle;
a pruning structure adapted to prune a tree;
a housing structure adapted to house the pruning structure inside;
wherein, when the computer readable program instructions are executed by the central processing unit:
the flight state of the unmanned aerial vehicle is controlled by a flight state control section; and,
the pruning state is controlled by a pruning state control section that controls the state of the pruning structure between a housed state in which the pruning structure is housed inside the housing structure and an exposed state in which the pruning structure is exposed to the outside of the housing structure,
wherein the pruning state control section controls the state of the pruning structure to the housed state during landing processes; and,
wherein the pruning state control section controls the state of the pruning structure to the wherein the pruning state control section controls the state of the pruning structure to the housed state when a strength of an externally received control signal related to the control of the unmanned aerial vehicle is weaker than a predetermined strength and the flight state control section controls the flight state of the unmanned aerial vehicle to a landing position when the pruning structure is housed inside the housing structure.

4. The unmanned aerial vehicle according to claim 1, wherein the pruning state control section controls the state of the pruning structure to the housed state when a distance from the unmanned aerial vehicle to humans and/or animals in a periphery of the unmanned aerial vehicle is less than or equal to a specific distance and the flight state control section controls the flight state of the unmanned aerial vehicle to a landing position when the pruning structure is housed inside the housing structure.

5. The unmanned aerial vehicle according to claim 1, wherein the non-transitory computer readable medium stores computer readable program instructions to acquire altitude information and control an altitude of the unmanned aerial vehicle; and,
wherein the pruning state control section controls the state of the pruning structure to the housed state when the altitude is not within a predetermined range.

6. The unmanned aerial vehicle according to claim 1, wherein the non-transitory computer readable medium stores computer readable program instructions to acquire geographic position information and control a geographic position of the unmanned aerial vehicle; and,
wherein the flight state control section controls the state of the pruning structure to the housed state when the acquired geographic position information is not a geographic area where the pruning structure can be exposed, and the flight state control section controls the flight state of the unmanned aerial vehicle to a landing position when the pruning structure is housed inside the housing structure.

7. The unmanned aerial vehicle system according to claim 1, wherein the unmanned aerial vehicle is a multicopter.

* * * * *